(12) United States Patent
Wang et al.

(10) Patent No.: US 11,303,925 B2
(45) Date of Patent: Apr. 12, 2022

(54) IMAGE CODING METHOD, ACTION RECOGNITION METHOD, AND ACTION RECOGNITION APPARATUS

(71) Applicant: HUAWEI TECHNOLOGIES CO., LTD., Guangdong (CN)

(72) Inventors: Jiangliu Wang, Hong Kong (CN); Kebin Yuan, Shenzhen (CN); Yunhui Liu, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/903,938

(22) Filed: Jun. 17, 2020

(65) Prior Publication Data
US 2020/0322626 A1    Oct. 8, 2020

Related U.S. Application Data

(63) Continuation of application No. PCT/CN2018/120337, filed on Dec. 11, 2018.

(30) Foreign Application Priority Data

Dec. 19, 2017   (CN) .......................... 201711378734.3

(51) Int. Cl.
*H04N 19/54* (2014.01)
*G06K 9/00* (2006.01)

(52) U.S. Cl.
CPC ......... *H04N 19/54* (2014.11); *G06K 9/00335* (2013.01)

(58) Field of Classification Search
CPC ............... H04N 19/54; G06K 9/00335; G06K 9/00342; G06N 3/02
See application file for complete search history.

(56) References Cited

U.S. PATENT DOCUMENTS

9,600,717 B1 *   3/2017   Dai ..................... G06K 9/00342
9,633,282 B2     4/2017   Sharma et al.
2004/0119716 A1  6/2004   Park et al.
(Continued)

FOREIGN PATENT DOCUMENTS

CN   101763647 A   6/2010
CN   102663449 A   9/2012
(Continued)

OTHER PUBLICATIONS

Extended European Search Report issued in European Application No. 18891958.3 dated Jan. 14, 2021, 12 pages.
(Continued)

*Primary Examiner* — Tracy Y. Li
(74) *Attorney, Agent, or Firm* — Fish & Richardson P.C.

(57) ABSTRACT

This application discloses an image coding method comprising: obtaining a plurality of groups of human skeleton data associated with performing an action by a human body, wherein each group of the human skeleton data comprises joint data associated with a joint for performing the action; extracting, based on joint data in the plurality of groups of human skeleton data, a motion feature matrix corresponding to the plurality of groups of human skeleton data; and encoding the motion feature matrix to obtain a motion feature image.

14 Claims, 9 Drawing Sheets

(56) References Cited

U.S. PATENT DOCUMENTS

| | | | |
|---|---|---|---|
| 2010/0271615 A1* | 10/2010 | Sebastian | G06T 7/70 |
| | | | 356/4.01 |
| 2011/0228976 A1* | 9/2011 | Fitzgibbon | G06K 9/6206 |
| | | | 382/103 |
| 2012/0057761 A1 | 3/2012 | Li et al. | |
| 2015/0117540 A1 | 4/2015 | Morimoto | |
| 2015/0367174 A1* | 12/2015 | Okazaki | A61B 5/11 |
| | | | 473/409 |
| 2016/0042227 A1 | 2/2016 | Zhong | |
| 2016/0100165 A1 | 4/2016 | Zhao | |
| 2016/0328604 A1* | 11/2016 | Bulzacki | G06Q 10/063 |
| 2020/0178851 A1* | 6/2020 | Singhose | A61B 5/1128 |

FOREIGN PATENT DOCUMENTS

| | | |
|---|---|---|
| CN | 103310191 A | 9/2013 |
| CN | 104573665 A | 4/2015 |
| CN | 104850846 A | 8/2015 |
| CN | 105930767 A | 9/2016 |
| CN | 106056035 A | 10/2016 |
| CN | 106384093 A | 2/2017 |
| CN | 106647282 A | 5/2017 |
| CN | 106897670 A | 6/2017 |
| CN | 107301370 A | 10/2017 |

OTHER PUBLICATIONS

Liu et al., "Enhanced skeleton visualization for view invariant human action recognition," Pattern Recognition, vol. 68, Mar. 3, 2017, 18 pages.

Lou et al., "A novel scheme of ROI detection and transcoding for mobile devices in high-definition videoconferencing," Proceedings of the 5th Workshop on Mobile Video, Feb. 27, 2013, 6 pages.

Naka et al., "A Compression/Decompression Method for Streaming Based Humanoid Animation," Proceedings from Fourth Symposium on the Virtual Reality Modeling Language 1999, Feb. 23, 1999, 8 pages.

Ye et al., "A Survey on Human Motion Analysis from Depth Data," Big Data Analytics in the Social and Ubiquitous Context:5th International Workshop On Modeling Social Media, Jan. 1, 2013, 40 pages.

Zou et al., "Human Action Recognition by Mining Discriminative Segment with Novel Skeleton Joint Feature," Big Data Analytics in the Social and Ubiquitous Context, 5th International Workshop On Modeling Social Media, Dec. 13, 2013, 12 pages.

Wu, "Human Behavior Recognition Based on Multi-sensor Devices". Nanjing University of Science and Technology, Jul. 2014, 71 pages (With English Abstract).

Jing et al., "Sudden violence identification algorithm based on motion feature", Journal of Computer Applications, vol. 31 No. 2, Feb. 2011, 4 pages (With English translation).

Office Action issued in Chinese Application No. 201711378734.3 dated Jun. 3, 2020, 23 pages (With English Translation).

PCT International Search Report and Written Opinion in International Application No. PCT/CN2018/120,337, dated Mar. 6, 2019, 17 pages (With English Translation).

Office Action issued in Chinese Application No. 201711378734.3 dated May 8, 2021, 28 pages (with English translation).

* cited by examiner

FIG. 8

IMAGE CODING METHOD, ACTION RECOGNITION METHOD, AND ACTION RECOGNITION APPARATUS

CROSS-REFERENCE TO RELATED APPLICATIONS

This application is a continuation of International Application No. PCT/CN2018/120337, filed on Dec. 11, 2018, which claims priority to Chinese Patent Application No. 201711378734.3, filed on Dec. 19, 2017. The disclosures of the aforementioned applications are hereby incorporated by reference in their entireties.

TECHNICAL FIELD

This application relates to the field of artificial intelligence technologies, and in particular, to an image coding method, an action recognition method, and a computer device.

BACKGROUND

With development of artificial intelligence technologies, action recognition technologies based on artificial intelligence technologies have a wide range of application scenarios in social life, including a home child care-giving robot, dangerous behavior monitoring in a public place, human-computer interaction game development, and the like. Based on the action recognition technologies, a user's action can be recognized to make a warning about the user's dangerous action in a timely manner, to avoid a dangerous event.

In a process of recognizing the user's action, a plurality of groups of human skeleton data need to be collected by using a collection device, an action feature vector sequence is formed by using joint point features extracted from each group of human skeleton data, and action feature vector sequences corresponding to the plurality of groups of human skeleton data are stored, so as to recognize an action based on the stored action feature vector sequences.

However, because a data amount of human skeleton data is relatively large, a quantity of the plurality of action feature vector sequences extracted from the plurality of groups of human skeleton data is also relatively large, and consequently, storage resources and calculation resources are greatly consumed. Therefore, a method for reducing storage resources and calculation resources of human skeleton data is urgently needed.

SUMMARY

Embodiments of this application provide an image coding method, an action recognition method, and a computer device, so as to resolve a problem that storage resources and calculation resources are greatly consumed because of a relatively large data amount of human skeleton data in the related art.

According to a first aspect, an image coding method is provided. The method includes: obtaining a plurality of groups of human skeleton data of performing a target action, where each group of human skeleton data includes joint point data of performing the target action; extracting, based on joint point data in the plurality of groups of human skeleton data, a motion feature matrix corresponding to the plurality of groups of human skeleton data and encoding the motion feature matrix to obtain a motion feature image.

In the solution shown in this application, the plurality of groups of human skeleton data are encoded as one motion feature image, thereby reducing consumption of storage resources and calculation resources.

In a first possible implementation of the first aspect, when the motion feature image includes a linear velocity matrix, and the joint point data includes coordinates of a corresponding joint point in a three-dimensional coordinate system, coordinates of a joint point in a first group of human skeleton data in the three-dimensional coordinate system may be subtracted from coordinates of the corresponding joint point in a second group of human skeleton data in the three-dimensional coordinate system to obtain linear velocity units corresponding to the first group of human skeleton data; and further, a linear velocity matrix corresponding to the plurality of groups of human skeleton data is formed by using all the obtained linear velocity units.

The first group of human skeleton data and the second group of human skeleton data are any two adjacent groups of human skeleton data in the plurality of groups of human skeleton data, and the first group of human skeleton data is a previous group of human skeleton data of the second group of human skeleton data.

In the solution shown in this application, an obtaining manner of a linear velocity matrix corresponding to human skeleton data is provided.

In a second possible implementation of the first aspect, the linear velocity matrix may be preprocessed, a plurality of linear velocity units in the preprocessed linear velocity matrix are encoded to obtain a plurality of linear velocity pixel frames, and further, a linear velocity image is formed by using the plurality of linear velocity pixel frames.

The preprocessing includes size normalization or the like.

In a third possible implementation of the first aspect, the linear velocity matrix is preprocessed, a plurality of linear velocity units in the preprocessed linear velocity matrix are encoded to obtain a plurality of linear velocity pixel frames, a plurality of key linear velocity pixel frames are extracted from the plurality of linear velocity pixel frames, and further, a linear velocity image is formed by using the plurality of key linear velocity pixel frames.

The key linear velocity pixel frame is a pixel frame that includes various action information and that can distinguish between different actions.

In a fourth possible implementation of the first aspect, when the linear velocity matrix is preprocessed, a maximum linear velocity element value and a minimum linear velocity element value in the linear velocity matrix may be obtained, and then normalization processing is performed on each linear velocity element value in the linear velocity matrix based on the maximum linear velocity element value and the minimum linear velocity element value, to obtain a normalized linear velocity matrix.

Each linear velocity element value in the normalized linear velocity matrix is between a first value and a second value. The first value is less than the second value. The first value may be 0, and the second value may be 255.

In the solution shown in this application, a manner of preprocessing a linear velocity matrix is provided.

In a fifth possible implementation of the first aspect, coordinates of a joint point in each preprocessed linear velocity unit in the three-dimensional coordinate system are used as image channels, and a plurality of preprocessed linear velocity units are encoded to obtain a plurality of linear velocity pixel frames.

The image channels are primary colors used to form pixels in an image, and include a red channel, a green channel, a blue channel, and the like.

In the solution shown in this application, coordinates in the three-dimensional coordinate system are used as image channels to encode an image, thereby providing a method for encoding, as an image, a motion feature matrix represented by numbers.

In a sixth possible implementation of the first aspect, linear velocity energy change values of the plurality of linear velocity pixel frames are calculated based on the preprocessed linear velocity matrix, and then the plurality of key linear velocity pixel frames are extracted from the plurality of linear velocity pixel frames in descending order of the linear velocity energy change values.

In a seventh possible implementation of the first aspect, a quadratic sum of coordinates of each joint point in a first linear velocity pixel frame in the three-dimensional coordinate system is calculated, and the quadratic sums of the coordinates of all the joint points in the three-dimensional coordinate system are added up to obtain a linear velocity energy value of the first linear velocity pixel frame; a quadratic sum of coordinates of each joint point in a second linear velocity pixel frame in the three-dimensional coordinate system is calculated, and the quadratic sums of the coordinates of all the joint points in the three-dimensional coordinate system are added up to obtain a linear velocity energy value of the second linear velocity pixel frame; and further, the linear velocity energy value of the first linear velocity pixel frame is subtracted from the linear velocity energy value of the second linear velocity pixel frame to obtain a linear velocity energy change value of the first linear velocity pixel frame.

The first linear velocity pixel frame and the second linear velocity pixel frame are any two adjacent linear velocity pixel frames, and the first linear velocity pixel frame is a previous linear velocity pixel frame of the second linear velocity pixel frame.

In an eighth possible implementation of the first aspect, when the motion feature matrix includes an angular velocity matrix, and the joint point data includes coordinates of a corresponding joint point in a three-dimensional coordinate system, direction angles of joint points of the plurality of groups of human skeleton data in the three-dimensional coordinate system may be calculated based on coordinates of the joint points of the plurality of groups of human skeleton data in the three-dimensional coordinate system; direction angles of a joint point in a first group of human skeleton data in the three-dimensional coordinate system are subtracted from direction angles of the corresponding joint point in a second group of human skeleton data in the three-dimensional coordinate system to obtain angular velocity units; and further, an angular velocity matrix corresponding to the plurality of groups of human skeleton data is formed by using all the obtained angular velocity units.

The first group of human skeleton data and the second group of human skeleton data are any two adjacent groups of human skeleton data, and the first group of human skeleton data is a previous group of human skeleton data of the second group of human skeleton data.

In a ninth possible implementation of the first aspect, the angular velocity matrix may be preprocessed, a plurality of angular velocity units in the preprocessed linear velocity matrix are encoded to obtain a plurality of angular velocity pixel frames, and further, an angular velocity image is formed by using the plurality of angular velocity pixel frames.

In a tenth possible implementation of the first aspect, the angular velocity matrix may be preprocessed, a plurality of angular velocity units in the preprocessed angular velocity matrix are encoded to obtain a plurality of angular velocity pixel frames, then a plurality of key angular velocity pixel frames are extracted from the plurality of angular velocity pixel frames, and further, an angular velocity image is formed by using the plurality of key angular velocity pixel frames.

In an eleventh possible implementation of the first aspect, a maximum angular velocity element value and a minimum angular velocity element value in the angular velocity matrix may be obtained, and normalization processing is performed on each angular velocity element value in the angular velocity matrix based on the maximum angular velocity element value and the minimum angular velocity element value, to obtain a normalized angular velocity matrix.

Each angular velocity element value in the normalized angular velocity matrix is between a first value and a second value, and the first value is less than the second value. The first value is 0, and the second value is 255.

In a twelfth possible implementation of the first aspect, direction angles of a joint point in each preprocessed angular velocity unit in the three-dimensional coordinate system may be used as image channels, and a plurality of preprocessed angular velocity units are encoded to obtain a plurality of angular velocity pixel frames.

In a thirteenth possible implementation of the first aspect, angular velocity energy change values of the plurality of angular velocity pixel frames may be calculated based on the preprocessed angular velocity matrix, and then the plurality of key angular velocity pixel frames are extracted from the plurality of angular velocity pixel frames in descending order of the angular velocity energy change values.

In a fourteenth possible implementation of the first aspect, a quadratic sum of direction angles of each joint point in a first angular velocity pixel frame in the three-dimensional coordinate system is calculated, and the quadratic sums of the direction angles of all the joint points in the three-dimensional system are added up to obtain an angular velocity energy value of the first angular velocity pixel frame; a quadratic sum of direction angles of each joint point in a second angular velocity pixel frame in the three-dimensional coordinate system is calculated, and the quadratic sums of the direction angles of all the joint points in the three-dimensional coordinate system are added up to obtain an angular velocity energy value of the second angular velocity pixel frame, where the first angular velocity pixel frame and the second angular velocity pixel frame are any two adjacent angular velocity pixel frames, and the first angular velocity pixel frame is a previous angular velocity pixel frame of the second angular velocity pixel frame; and further, the linear velocity energy value of the first angular velocity pixel frame is subtracted from the linear velocity energy value of the second angular velocity pixel frame to obtain a linear velocity energy change value of the first angular velocity pixel frame.

In a fifteenth possible implementation of the first aspect, at least one motion feature image of the target action and an identifier of the target action are input into a CNN (Convolutional Neural Network) model, and training is performed to obtain an action recognition model.

According to a second aspect, an action recognition model training method is provided. The method includes: obtaining a plurality of reference motion feature images respectively corresponding to a plurality of types of actions; and inputting the plurality of reference motion feature images and identifiers of the plurality of actions into a CNN model, and performing training to obtain an action recognition model.

Each reference motion feature image may be obtained by using the method described in the first aspect.

According to a third aspect, an action recognition method is provided. The method includes: obtaining a to-be-recognized motion feature image, and recognizing the to-be-recognized motion feature image based on an action recognition model, to obtain a recognition result.

The to-be-recognized motion feature image is an image obtained by encoding a plurality of groups of to-be-recognized human skeleton data of a to-be-recognized action. The action recognition model is obtained through training based on a plurality of reference motion feature images respectively corresponding to a plurality of types of actions and identifiers of the plurality of types of actions, and the recognition result is used to indicate an action type of the to-be-recognized action.

In the solution shown in this application, the to-be-recognized motion feature image is obtained, and then the to-be-recognized motion feature image is recognized based on the established action recognition model, so as to obtain the recognition result of the to-be-recognized action. Because a data amount of the motion feature image is smaller than a data amount of a plurality of action feature vector sequences, storage resources and calculation resources are greatly saved while recognition accuracy is ensured.

In a first possible implementation of the third aspect, the plurality of groups of to-be-recognized human skeleton data of performing the to-be-recognized action are collected; a to-be-recognized motion feature matrix corresponding to the plurality of groups of to-be-recognized human skeleton data is extracted based on joint point data in the plurality of groups of to-be-recognized human skeleton data and further, the to-be-recognized motion feature matrix is encoded to obtain the to-be-recognized motion feature image.

Each group of to-be-recognized human skeleton data includes joint point data of performing the to-be-recognized action.

In a second possible implementation of the third aspect, when the to-be-recognized motion feature matrix includes a to-be-recognized linear velocity matrix, and the joint point data includes coordinates of a corresponding joint point in a three-dimensional coordinate system, coordinates of a joint point in a first group of to-be-recognized human skeleton data in the three-dimensional coordinate system are subtracted from coordinates of the corresponding joint point in a second group of to-be-recognized human skeleton data in the three-dimensional coordinate system to obtain to-be-recognized linear velocity units of the first group of to-be-recognized human skeleton data; and further, a to-be-recognized linear velocity matrix corresponding to the plurality of groups of to-be-recognized human skeleton data is formed by using all the obtained to-be-recognized linear velocity units.

The first group of to-be-recognized human skeleton data and the second group of to-be-recognized human skeleton data are any two adjacent groups of to-be-recognized human skeleton data in the plurality of groups of to-be-recognized human skeleton data, and the first group of to-be-recognized human skeleton data is a previous group of to-be-recognized human skeleton data of the second group of to-be-recognized human skeleton data.

In a third possible implementation of the third aspect, the to-be-recognized linear velocity matrix may be preprocessed, a plurality of linear velocity units in the preprocessed to-be-recognized linear velocity matrix are encoded to obtain a plurality of to-be-recognized linear velocity pixel frames, and further, a to-be-recognized linear velocity image is formed by using the plurality of to-be-recognized linear velocity pixel frames.

In a fourth possible implementation of the third aspect, the to-be-recognized linear velocity matrix may be preprocessed, and a plurality of to-be-recognized linear velocity units in the preprocessed to-be-recognized linear velocity matrix are encoded to obtain a plurality of to-be-recognized linear velocity pixel frames; then a plurality of to-be-recognized key linear velocity pixel frames are extracted from the plurality of to-be-recognized linear velocity pixel frames; and further, a to-be-recognized linear velocity image is formed by using the plurality of to-be-recognized key linear velocity pixel frames.

In a fifth possible implementation of the third aspect, a maximum to-be-recognized linear velocity element value and a minimum to-be-recognized linear velocity element value in the to-be-recognized linear velocity matrix are obtained, and then normalization processing is performed on each to-be-recognized linear velocity element value in the to-be-recognized linear velocity matrix based on the maximum to-be-recognized linear velocity element value and the minimum to-be-recognized linear velocity element value, to obtain a normalized to-be-recognized linear velocity matrix.

Each to-be-recognized linear velocity element value in the normalized to-be-recognized linear velocity matrix is between a first value and a second value, and the first value is less than the second value. The first value may be 0, and the second value may be 255.

In a sixth possible implementation of the third aspect, coordinates of a joint point in each preprocessed to-be-recognized linear velocity unit in the three-dimensional coordinate system are used as image channels, and a plurality of preprocessed to-be-recognized linear velocity units are encoded to obtain a plurality of to-be-recognized linear velocity pixel frames.

In a seventh possible implementation of the third aspect, linear velocity energy change values of the plurality of to-be-recognized linear velocity pixel frames may be calculated based on the preprocessed to-be-recognized linear velocity matrix, and then the plurality of to-be-recognized key linear velocity pixel frames are extracted from the plurality of to-be-recognized linear velocity pixel frames in descending order of the linear velocity energy change values.

In an eighth possible implementation of the third aspect, a quadratic sum of coordinates of each joint point in a first to-be-recognized linear velocity pixel frame in the three-dimensional coordinate system is calculated, and the quadratic sums of the coordinates of all the joint points in the three-dimensional coordinate system are added up to obtain a linear velocity energy value of the first to-be-recognized linear velocity pixel frame; a quadratic sum of coordinates of each joint point in a second to-be-recognized linear velocity pixel frame in the three-dimensional coordinate system is further calculated, and the quadratic sums of the coordinates of all the joint points in the three-dimensional coordinate system are added up to obtain a linear velocity energy value of the second to-be-recognized linear velocity pixel frame; and the linear velocity energy value of the first to-be-recognized linear velocity pixel frame is subtracted from the linear velocity energy value of the second to-berecognized linear velocity pixel frame to obtain a linear velocity energy change value of the first to-be-recognized linear velocity pixel frame.

The first to-be-recognized linear velocity pixel frame and the second to-be-recognized linear velocity pixel frame are any two adjacent to-be-recognized linear velocity pixel frames, and the first to-be-recognized linear velocity pixel frame is a previous to-be-recognized linear velocity pixel frame of the second to-be-recognized linear velocity pixel frame.

In a ninth possible implementation of the third aspect, when the to-be-recognized motion feature matrix includes a to-be-recognized angular velocity matrix, and the joint point data includes coordinates of a corresponding joint point in a three-dimensional coordinate system, direction angles of a joint point in the plurality of groups of to-be-recognized human skeleton data in the three-dimensional coordinate system may be calculated based on a coordinate matrix corresponding to the plurality of groups of to-be-recognized human skeleton data; direction angles of a joint point in a first group of to-be-recognized human skeleton data in the three-dimensional coordinate system are subtracted from direction angles of the corresponding joint point in a second group of to-be-recognized human skeleton data in the three-dimensional coordinate system to obtain to-be-recognized angular velocity units; and further, a to-be-recognized angular velocity matrix corresponding to the plurality of groups of to-be-recognized human skeleton data is formed by using all the obtained to-be-recognized angular velocity units.

The first group of to-be-recognized human skeleton data and the second group of to-be-recognized human skeleton data are any two adjacent groups of to-be-recognized human skeleton data, and the first group of to-be-recognized human skeleton data is a previous group of to-be-recognized human skeleton data of the second group of to-be-recognized human skeleton data.

In a tenth possible implementation of the third aspect, the to-be-recognized angular velocity matrix is preprocessed, a plurality of to-be-recognized angular velocity units in the preprocessed to-be-recognized linear velocity matrix are encoded to obtain a plurality of to-be-recognized angular velocity pixel frames, and further, a to-be-recognized angular velocity image is formed by using the plurality of to-be-recognized angular velocity pixel frames.

In an eleventh possible implementation of the third aspect, the to-be-recognized angular velocity matrix may be preprocessed, and a plurality of to-be-recognized angular velocity units in the preprocessed to-be-recognized angular velocity matrix are encoded to obtain a plurality of to-be-recognized angular velocity pixel frames; then a plurality of to-be-recognized key angular velocity pixel frames are extracted from the plurality of to-be-recognized angular velocity pixel frames; and further, a to-be-recognized angular velocity image is formed by using the plurality of to-be-recognized key angular velocity pixel frames.

In a twelfth possible implementation of the third aspect, a maximum to-be-recognized angular velocity element value and a minimum to-be-recognized angular velocity element value in the to-be-recognized angular velocity matrix are obtained, and normalization processing is performed on each to-be-recognized angular velocity element value in the to-be-recognized angular velocity matrix based on the maximum to-be-recognized angular velocity element value and the minimum to-be-recognized angular velocity element value, to obtain a normalized to-be-recognized angular velocity matrix.

Each to-be-recognized angular velocity element value in the normalized to-be-recognized angular velocity matrix is between a first value and a second value, and the first value is less than the second value. The first value is 0, and the second value is 255.

In a thirteenth possible implementation of the third aspect, direction angles of a joint point in each preprocessed to-be-recognized angular velocity unit in the three-dimensional coordinate system are used as image channels, and a plurality of preprocessed to-be-recognized angular velocity units are encoded to obtain a plurality of to-be-recognized angular velocity pixel frames.

In a fourteenth possible implementation of the third aspect, angular velocity energy change values of the plurality of to-be-recognized angular velocity pixel frames may be calculated based on the preprocessed to-be-recognized angular velocity matrix, and then the plurality of to-be-recognized key angular velocity pixel frames are extracted from the plurality of to-be-recognized angular velocity pixel frames in descending order of the angular velocity energy change values.

In a fifteenth possible implementation of the third aspect, a quadratic sum of direction angles of each joint point in a first to-be-recognized angular velocity pixel frame in the three-dimensional coordinate system may be calculated, and the quadratic sums of the direction angles of all the joint points in the three-dimensional system are added up to obtain an angular velocity energy value of the first to-be-recognized angular velocity pixel frame; a quadratic sum of direction angles of each joint point in a second to-be-recognized angular velocity pixel frame in the three-dimensional coordinate system is calculated, and the quadratic sums of the direction angles of all the joint points in the three-dimensional coordinate system are added up to obtain an angular velocity energy value of the second to-be-recognized angular velocity pixel frame; and further, the linear velocity energy value of the first to-be-recognized angular velocity pixel frame is subtracted from the linear velocity energy value of the second to-be-recognized angular velocity pixel frame to obtain a linear velocity energy change value of the first to-be-recognized angular velocity pixel frame.

The first to-be-recognized angular velocity pixel frame and the second to-be-recognized angular velocity pixel frame are any two adjacent to-be-recognized angular velocity pixel frames, and the first to-be-recognized angular velocity pixel frame is a previous to-be-recognized angular velocity pixel frame of the second to-be-recognized angular velocity pixel frame.

In a sixteenth possible implementation of the third aspect, a zero padding operation is further performed on the to-be-recognized motion feature image, and the to-be-recognized motion feature image obtained through the zero padding operation is recognized based on the action recognition model, to obtain the recognition result.

In a seventeenth possible implementation of the third aspect, the action recognition model used in the third aspect may be obtained through training by using the method in the second aspect.

According to a fourth aspect, an image coding apparatus is provided. The apparatus includes:

a data obtaining unit, configured to obtain a plurality of groups of human skeleton data of performing a target action, where each group of human skeleton data includes joint point data of performing the target action:

a feature extraction unit, configured to extract, based on joint point data in the plurality of groups of human skeleton data, a motion feature matrix corresponding to the plurality of groups of human skeleton data; and a feature coding unit, configured to encode a motion feature matrix to obtain a motion feature image.

In a first possible implementation of the fourth aspect, the motion feature matrix includes a linear velocity matrix, and the joint point data includes coordinates of a corresponding joint point in a three-dimensional coordinate system; and the feature extraction unit is configured to: subtract coordinates of a joint point in a first group of human skeleton data in the three-dimensional coordinate system from coordinates of the corresponding joint point in a second group of human skeleton data in the three-dimensional coordinate system to obtain linear velocity units corresponding to the first group of human skeleton data, where the first group of human skeleton data and the second group of human skeleton data are any two adjacent groups of human skeleton data in the plurality of groups of human skeleton data, and the first group of human skeleton data is a previous group of human skeleton data of the second group of human skeleton data; and form, by using all the obtained linear velocity units, a linear velocity matrix corresponding to the plurality of groups of human skeleton data.

In a second possible implementation of the fourth aspect, the feature coding unit is configured to: preprocess the linear velocity matrix; and encode a plurality of linear velocity units in the preprocessed linear velocity matrix to obtain a plurality of linear velocity pixel frames; and form a linear velocity image by using the plurality of linear velocity pixel frames.

In a third possible implementation of the fourth aspect, the feature coding unit is configured to: preprocess the linear velocity matrix; and encode a plurality of linear velocity units in the preprocessed linear velocity matrix to obtain a plurality of linear velocity pixel frames; extract a plurality of key linear velocity pixel frames from the plurality of linear velocity pixel frames; and form a linear velocity image by using the plurality of key linear velocity pixel frames.

In a fourth possible implementation of the fourth aspect, the feature coding unit is configured to: obtain a maximum linear velocity element value and a minimum linear velocity element value in the linear velocity matrix; and perform normalization processing on each linear velocity element value in the linear velocity matrix based on the maximum linear velocity element value and the minimum linear velocity element value, to obtain a normalized linear velocity matrix.

Each linear velocity element value in the normalized linear velocity matrix is between a first value and a second value. The first value is less than the second value.

In a fifth possible implementation of the fourth aspect, the feature coding unit is configured to: use coordinates of a joint point in each preprocessed linear velocity unit in the three-dimensional coordinate system as image channels, and encode a plurality of preprocessed linear velocity units to obtain a plurality of linear velocity pixel frames.

In a sixth possible implementation of the fourth aspect, the feature coding unit is configured to: calculate linear velocity energy change values of the plurality of linear velocity pixel frames based on the preprocessed linear velocity matrix; and extract the plurality of key linear velocity pixel frames from the plurality of linear velocity pixel frames in descending order of the linear velocity energy change values.

In a seventh possible implementation of the fourth aspect, the feature coding unit is configured to: calculate a quadratic sum of coordinates of each joint point in a first linear velocity pixel frame in the three-dimensional coordinate system, and add up the quadratic sums of the coordinates of all the joint points in the three-dimensional coordinate system to obtain a linear velocity energy value of the first linear velocity pixel frame; calculate a quadratic sum of coordinates of each joint point in a second linear velocity pixel frame in the three-dimensional coordinate system, and add up the quadratic sums of the coordinates of all the joint points in the three-dimensional coordinate system to obtain a linear velocity energy value of the second linear velocity pixel frame, where the first linear velocity pixel frame and the second linear velocity pixel frame are any two adjacent linear velocity pixel frames, and the first linear velocity pixel frame is a previous linear velocity pixel frame of the second linear velocity pixel frame; and subtract the linear velocity energy value of the first linear velocity pixel frame from the linear velocity energy value of the second linear velocity pixel frame to obtain a linear velocity energy change value of the first linear velocity pixel frame.

In an eighth possible implementation of the fourth aspect, the motion feature matrix includes an angular velocity matrix, and the joint point data includes coordinates of a corresponding joint point in a three-dimensional coordinate system; and the feature coding unit is configured to: calculate direction angles of joint points of the plurality of groups of human skeleton data in the three-dimensional coordinate system based on coordinates of the joint points of the plurality of groups of human skeleton data in the three-dimensional coordinate system; subtract direction angles of a joint point in a first group of human skeleton data in the three-dimensional coordinate system from direction angles of the corresponding joint point in a second group of human skeleton data in the three-dimensional coordinate system to obtain angular velocity units, where the first group of human skeleton data and the second group of human skeleton data are any two adjacent groups of human skeleton data, and the first group of human skeleton data is a previous group of human skeleton data of the second group of human skeleton data; and form, by using all the obtained angular velocity units, an angular velocity matrix corresponding to the plurality of groups of human skeleton data.

In a ninth possible implementation of the fourth aspect, the feature coding unit is configured to: preprocess the angular velocity matrix; encode a plurality of angular velocity units in the preprocessed linear velocity matrix to obtain a plurality of angular velocity pixel frames; and form an angular velocity image by using the plurality of angular velocity pixel frames.

In a tenth possible implementation of the fourth aspect, the feature coding unit is configured to: preprocess the angular velocity matrix; encode a plurality of angular velocity units in the preprocessed angular velocity matrix to obtain a plurality of angular velocity pixel frames; extract a plurality of key angular velocity pixel frames from the plurality of angular velocity pixel frames; and form an angular velocity image by using the plurality of key angular velocity pixel frames.

In an eleventh possible implementation of the fourth aspect, the feature coding unit is configured to: obtain a maximum angular velocity element value and a minimum angular velocity element value in the angular velocity matrix; and perform normalization processing on each angular velocity element value in the angular velocity matrix based on the maximum angular velocity element value and the minimum angular velocity element value, to obtain a normalized angular velocity matrix.

Each angular velocity element value in the normalized angular velocity matrix is between a first value and a second value. The first value is less than the second value.

In a twelfth possible implementation of the fourth aspect, the feature coding unit is configured to: use direction angles of a joint point in each preprocessed angular velocity unit in the three-dimensional coordinate system as image channels, and encode a plurality of preprocessed angular velocity units to obtain a plurality of angular velocity pixel frames.

In a thirteenth possible implementation of the fourth aspect, the feature coding unit is configured to: calculate angular velocity energy change values of the plurality of angular velocity pixel frames based on the preprocessed angular velocity matrix; and extract the plurality of key angular velocity pixel frames from the plurality of angular velocity pixel frames in descending order of the angular velocity energy change values.

In a fourteenth possible implementation of the fourth aspect, the feature coding unit is configured to: calculate a quadratic sum of direction angles of each joint point in a first angular velocity pixel frame in the three-dimensional coordinate system, and add up the quadratic sums of the direction angles of all the joint points in the three-dimensional system to obtain an angular velocity energy value of the first angular velocity pixel frame; calculate a quadratic sum of direction angles of each joint point in a second angular velocity pixel frame in the three-dimensional coordinate system, and add up the quadratic sums of the direction angles of all the joint points in the three-dimensional coordinate system to obtain an angular velocity energy value of the second angular velocity pixel frame, where the first angular velocity pixel frame and the second angular velocity pixel frame are any two adjacent angular velocity pixel frames, and the first angular velocity pixel frame is a previous angular velocity pixel frame of the second angular velocity pixel frame; and subtract the linear velocity energy value of the first angular velocity pixel frame from the linear velocity energy value of the second angular velocity pixel frame to obtain a linear velocity energy change value of the first angular velocity pixel frame.

In a fifteenth possible implementation of the fourth aspect, the apparatus further includes:

a model training module, configured to: input at least one motion feature image of the target action and an identifier of the target action into a CNN model, and perform training to obtain an action recognition model.

According to a fifth aspect, an action recognition model training apparatus is provided. The apparatus includes:

an image obtaining unit, configured to obtain a plurality of reference motion feature images respectively corresponding to a plurality of types of actions, where each reference motion feature image is obtained by using the method in the first aspect; and a model training unit, configured to: input the plurality of reference motion feature images and identifiers of the plurality of actions into a convolutional neural network CNN model, and perform training to obtain an action recognition model.

According to a sixth aspect, an action recognition apparatus is provided. The apparatus includes:

an image obtaining unit, configured to: obtain a to-be-recognized motion feature image, where the to-be-recognized motion feature image is an image obtained by encoding a plurality of groups of to-be-recognized human skeleton data of a to-be-recognized action; and an image recognition unit, configured to recognize the to-be-recognized motion feature image based on an action recognition model, to obtain a recognition result, where the action recognition model is obtained through training based on a plurality of reference motion feature images respectively corresponding to a plurality of types of actions and identifiers of the plurality of types of actions, and the recognition result is used to indicate an action type of the to-be-recognized action.

In a first possible implementation of the sixth aspect, the image obtaining unit is configured to: collect the plurality of groups of to-be-recognized human skeleton data of performing the to-be-recognized action, where each group of to-be-recognized human skeleton data includes joint point data of performing the to-be-recognized action; extract, based on joint point data in the plurality of groups of to-be-recognized human skeleton data, a to-be-recognized motion feature matrix corresponding to the plurality of groups of to-be-recognized human skeleton data; and encode the to-be-recognized motion feature matrix to obtain a to-be-recognized motion feature image.

In a second possible implementation of the sixth aspect, the to-be-recognized motion feature matrix includes a to-be-recognized linear velocity matrix, and the joint point data includes coordinates of a corresponding joint point in a three-dimensional coordinate system; and the image collection unit is configured to: subtract coordinates of a joint point in a first group of to-be-recognized human skeleton data in the three-dimensional coordinate system from coordinates of the corresponding joint point in a second group of to-be-recognized human skeleton data in the three-dimensional coordinate system to obtain to-be-recognized linear velocity units of the first group of to-be-recognized human skeleton data, where the first group of to-be-recognized human skeleton data and the second group of to-be-recognized human skeleton data are any two adjacent groups of to-be-recognized human skeleton data in the plurality of groups of to-be-recognized human skeleton data, and the first group of to-be-recognized human skeleton data is a previous group of to-be-recognized human skeleton data of the second group of to-be-recognized human skeleton data; and form, by using all the obtained to-be-recognized linear velocity units, a to-be-recognized linear velocity matrix corresponding to the plurality of groups of to-be-recognized human skeleton data.

In a third possible implementation of the sixth aspect, the image collection unit is configured to: preprocess the to-be-recognized linear velocity matrix; encode a plurality of linear velocity units in the preprocessed to-be-recognized linear velocity matrix to obtain a plurality of to-be-recognized linear velocity pixel frames; and form a to-be-recognized linear velocity image by using the plurality of to-be-recognized linear velocity pixel frames.

In a fourth possible implementation of the sixth aspect, the image collection unit is configured to: preprocess the to-be-recognized linear velocity matrix; encode a plurality of to-be-recognized linear velocity units in the preprocessed to-be-recognized linear velocity matrix to obtain a plurality of to-be-recognized linear velocity pixel frames; extract a plurality of to-be-recognized key linear velocity pixel frames from the plurality of to-be-recognized linear velocity pixel frames; and form a to-be-recognized linear velocity image by using the plurality of to-be-recognized key linear velocity pixel frames.

In a fifth possible implementation of the sixth aspect, the image collection unit is configured to: obtain a maximum to-be-recognized linear velocity element value and a minimum to-be-recognized linear velocity element value in the to-be-recognized linear velocity matrix; and perform normalization processing on each to-be-recognized linear velocity element value in the to-be-recognized linear velocity matrix based on the maximum to-be-recognized linear velocity element value and the minimum to-be-recognized linear velocity element value, to obtain a normalized to-be-recognized linear velocity matrix, where each to-be-recognized linear velocity element value in the normalized to-be-recognized linear velocity matrix is between a first value and a second value, and the first value is less than the second value.

In a sixth possible implementation of the sixth aspect, the image collection unit is configured to: use coordinates of a joint point in each preprocessed to-be-recognized linear velocity unit in the three-dimensional coordinate system as image channels, and encode a plurality of preprocessed to-be-recognized linear velocity units to obtain a plurality of to-be-recognized linear velocity pixel frames.

In a seventh possible implementation of the sixth aspect, the image collection unit is configured to: calculate linear velocity energy change values of the plurality of to-be-recognized linear velocity pixel frames based on the preprocessed to-be-recognized linear velocity matrix; and extract the plurality of to-be-recognized key linear velocity pixel frames from the plurality of to-be-recognized linear velocity pixel frames in descending order of the linear velocity energy change values.

In an eighth possible implementation of the sixth aspect, the image collection unit is configured to: calculate a quadratic sum of coordinates of each joint point in a first to-be-recognized linear velocity pixel frame in the three-dimensional coordinate system, and add up the quadratic sums of the coordinates of all the joint points in the three-dimensional coordinate system to obtain a linear velocity energy value of the first to-be-recognized linear velocity pixel frame; calculate a quadratic sum of coordinates of each joint point in a second to-be-recognized linear velocity pixel frame in the three-dimensional coordinate system, and add up the quadratic sums of the coordinates of all the joint points in the three-dimensional coordinate system to obtain a linear velocity energy value of the second to-be-recognized linear velocity pixel frame, where the first to-be-recognized linear velocity pixel frame and the second to-be-recognized linear velocity pixel frame are any two adjacent to-be-recognized linear velocity pixel frames, and the first to-be-recognized linear velocity pixel frame is a previous to-be-recognized linear velocity pixel frame of the second to-be-recognized linear velocity pixel frame; and subtract the linear velocity energy value of the first to-be-recognized linear velocity pixel frame from the linear velocity energy value of the second to-be-recognized linear velocity pixel frame to obtain a linear velocity energy change value of the first to-be-recognized linear velocity pixel frame.

In a ninth possible implementation of the sixth aspect, the to-be-recognized motion feature matrix includes a to-be-recognized angular velocity matrix, and the joint point data includes coordinates of a corresponding joint point in a three-dimensional coordinate system; and the image collection unit is configured to: calculate direction angles of a joint point in the plurality of groups of to-be-recognized human skeleton data in the three-dimensional coordinate system based on a coordinate matrix corresponding to the plurality of groups of to-be-recognized human skeleton data; subtract direction angles of a joint point in a first group of to-be-recognized human skeleton data in the three-dimensional coordinate system from direction angles of the corresponding joint point in a second group of to-be-recognized human skeleton data in the three-dimensional coordinate system to obtain to-be-recognized angular velocity units, where the first group of to-be-recognized human skeleton data and the second group of to-be-recognized human skeleton data are any two adjacent groups of to-be-recognized human skeleton data, and the first group of to-be-recognized human skeleton data is a previous group of to-be-recognized human skeleton data of the second group of to-be-recognized human skeleton data; and form, by using all the obtained to-be-recognized angular velocity units, a to-be-recognized angular velocity matrix corresponding to the plurality of groups of to-be-recognized human skeleton data.

In a tenth possible implementation of the sixth aspect, the image collection unit is configured to: preprocess the to-be-recognized angular velocity matrix; encode a plurality of to-be-recognized angular velocity units in the preprocessed to-be-recognized linear velocity matrix to obtain a plurality of to-be-recognized angular velocity pixel frames; and form a to-be-recognized angular velocity image by using the plurality of to-be-recognized angular velocity pixel frames.

In an eleventh possible implementation of the sixth aspect, the image collection unit is configured to: preprocess the to-be-recognized angular velocity matrix; encode a plurality of to-be-recognized angular velocity units in the preprocessed to-be-recognized angular velocity matrix to obtain a plurality of to-be-recognized angular velocity pixel frames; extract a plurality of to-be-recognized key angular velocity pixel frames from the plurality of to-be-recognized angular velocity pixel frames; and form a to-be-recognized angular velocity image by using the plurality of to-be-recognized key angular velocity pixel frames.

In a twelfth possible implementation of the sixth aspect, the image collection unit is configured to: obtain a maximum to-be-recognized angular velocity element value and a minimum to-be-recognized angular velocity element value in the to-be-recognized angular velocity matrix; and perform normalization processing on each to-be-recognized angular velocity element value in the to-be-recognized angular velocity matrix based on the maximum to-be-recognized angular velocity element value and the minimum to-be-recognized angular velocity element value, to obtain a normalized to-be-recognized angular velocity matrix, where each to-be-recognized angular velocity element value in the normalized to-be-recognized angular velocity matrix is between a first value and a second value, and the first value is less than the second value.

In a thirteenth possible implementation of the sixth aspect, the image collection unit is configured to: use direction angles of a joint point in each preprocessed to-be-recognized angular velocity unit in the three-dimensional coordinate system as image channels, and encode a plurality of preprocessed to-be-recognized angular velocity units to obtain a plurality of to-be-recognized angular velocity pixel frames.

In a fourteenth possible implementation of the sixth aspect, the image collection unit is configured to: calculate angular velocity energy change values of the plurality of to-be-recognized angular velocity pixel frames based on the preprocessed to-be-recognized angular velocity matrix; and extract the plurality of to-be-recognized key angular velocity pixel frames from the plurality of to-be-recognized angular velocity pixel frames in descending order of the angular velocity energy change values.

In a fifteenth possible implementation of the sixth aspect, the image collection unit is configured to: calculate a quadratic sum of direction angles of each joint point in a first to-be-recognized angular velocity pixel frame in the three-dimensional coordinate system, and add up the quadratic sums of the direction angles of all the joint points in the three-dimensional system to obtain an angular velocity energy value of the first to-be-recognized angular velocity pixel frame; calculate a quadratic sum of direction angles of each joint point in a second to-be-recognized angular velocity pixel frame in the three-dimensional coordinate system, and add up the quadratic sums of the direction angles of all the joint points in the three-dimensional coordinate system to obtain an angular velocity energy value of the second to-be-recognized angular velocity pixel frame, where the first to-be-recognized angular velocity pixel frame and the second to-be-recognized angular velocity pixel frame are any two adjacent to-be-recognized angular velocity pixel frames, and the first to-be-recognized angular velocity pixel frame is a previous to-be-recognized angular velocity pixel frame of the second to-be-recognized angular velocity pixel frame; and subtract the linear velocity energy value of the first to-be-recognized angular velocity pixel frame from the linear velocity energy value of the second to-be-recognized angular velocity pixel frame to obtain a linear velocity energy change value of the first to-be-recognized angular velocity pixel frame.

In a sixteenth possible implementation of the sixth aspect, the apparatus further includes:

a zero-padding unit, configured to perform a zero padding operation on the to-be-recognized motion feature image; and an image recognition unit, configured to recognize, based on the action recognition model, the to-be-recognized motion feature image obtained through the zero padding operation, to obtain the recognition result.

In a seventeenth possible implementation of the sixth aspect, the action recognition model according to the sixth aspect is obtained by using the method in the first aspect.

According to a seventh aspect, a computer device is provided, including a processor, a memory, a communications interface, and a bus.

The memory, the processor, and the communications interface are connected to each other by using the bus, the memory is configured to store a computer instruction, and when the computer device runs, the processor runs the computer instruction, so that the computer device performs the image coding method in the first aspect.

According to an eighth aspect, a computer device is provided, including a processor, a memory, a communications interface, and a bus.

The memory, the processor, and the communications interface are connected to each other by using the bus, the memory is configured to store a computer instruction, and when the computer device runs, the processor runs the computer instruction, so that the computer device performs the action recognition model training method in the second aspect.

According to a ninth aspect, a computer device is provided, including a processor, a memory, a communications interface, and a bus.

The memory, the processor, and the communications interface are connected to each other by using the bus, the memory is configured to store a computer instruction, and when the computer device runs, the processor runs the computer instruction, so that the computer device performs the action recognition method in the third aspect.

According to a tenth aspect, a computer-readable storage medium is provided. The storage medium stores at least one instruction, and when the instruction is run on a computer, the computer device is enabled to perform the image coding method in the first aspect.

According to an eleventh aspect, a computer-readable storage medium is provided. The storage medium stores at least one instruction, and when the instruction is run on a computer device, the computer device is enabled to perform the action recognition model training method in the second aspect.

According to a twelfth aspect, a computer-readable storage medium is provided. The storage medium stores at least one instruction, and when the instruction is run on a computer device, the computer device is enabled to perform the action recognition method in the third aspect.

According to a thirteenth aspect, a computer program product that includes an instruction is provided. When the instruction is run on a computer device, the computer device is enabled to perform the method in the first aspect.

According to a fourteenth aspect, a computer program product that includes an instruction is provided. When the instruction is run on a computer device, the computer device is enabled to perform the method in the second aspect.

According to a fifteenth aspect, a computer program product that includes an instruction is provided. When the instruction is run on a computer device, the computer device is enabled to perform the method in the third aspect.

BRIEF DESCRIPTION OF DRAWINGS

FIG. 5 shows a matrix formed by data of M main joint points according to an embodiment of this application:

FIG. 6 is a schematic diagram of a linear velocity matrix according to an embodiment of this application;

FIG. 8 is a schematic diagram of an angular velocity matrix according to an embodiment of this application;

DESCRIPTION OF EMBODIMENTS

Figure 1:
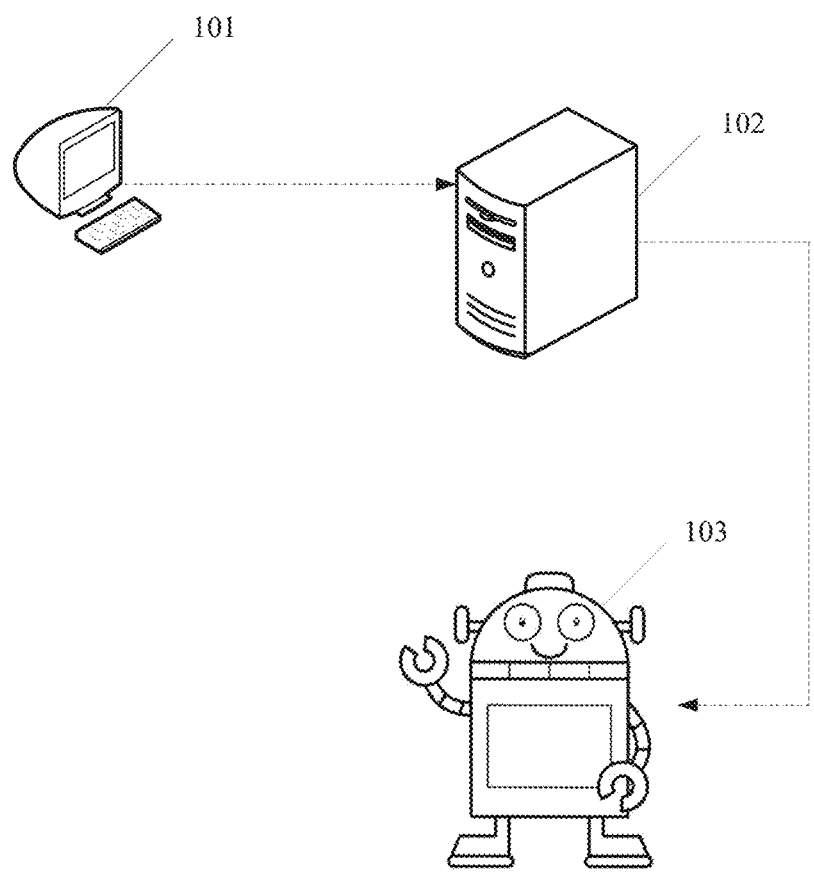
FIG. 1 shows an implementation environment of an image coding method, an action recognition model training method, and an action recognition method according to an embodiment of this application.

To make the objectives, technical solutions, and advantages of this application clearer, the following further describes the implementations of this application in detail with reference to the accompanying drawings.

Currently, in the related art, the following method is mainly used for recognizing an action:

Step 1: Collect, based on a motion sensing device, human skeleton data generated when a user performs a target action. The motion sensing device is a collection device that can obtain at least three-dimensional (3D) spatial location information and angle information of each joint point of a human skeleton. The human skeleton data includes data of each joint point that is collected by the motion sensing collection device.

Step 2: Extract data of a main joint point from the human skeleton data. The main joint point is a joint point that plays a key role in action or behavior recognition.

Step 3: Extract an action feature from the data of the main joint point, and form an action feature vector sequence by using the extracted action feature. The action features include features such as a position, an angle, a velocity, a velocity of a main joint point, and an included angle between main joints. The action feature vector sequence is a sequence of feature vectors formed by action features.

Step 4: Perform normalization processing on the action feature vector sequence to obtain a normalized action feature vector sequence.

Step 5: Store a correspondence between the normalized action feature vector sequence and the target action as an action sample to an action sample template library.

Step 6: Collect human skeleton data of the user in real time based on the motion sensing device, process the human skeleton data according to the method in step 2 to step 5, to obtain a to-be-recognized action feature vector sequence, and then calculate, by using a dynamic time warping algorithm, a distance value between the to-be-recognized action feature vector sequence and each normalized action feature vector sequence stored in the action sample template library.

Step 7: Calculate, based on the distance value calculated in step 6, a similarity between the to-be-recognized action feature vector sequence and each normalized action feature vector sequence in the action sample template library, and then recognize an action or a behavior of the user based on the similarity.

Because people have different heights, different body shapes, and the like, their action or behavior habits are also different. When an amount of data used to construct an action sample template library in the related art is relatively small the constructed action sample template library is not universally applicable, and accuracy of a recognition result is relatively low. When an amount of data used to construct an action sample template library is relatively large, a storage amount and a calculation amount correspondingly increase, but accuracy of a recognition result does not continue to improve. To resolve a problem in the related art, in the embodiments of this application, a plurality of groups of reference human skeleton data of performing each type of action are encoded based on the provided image coding method, to obtain a plurality of reference motion feature images, the plurality of reference feature images and identifiers of a plurality of actions are input into a CNN model based on a provided action recognition model training method, to obtain an action recognition model through training, and then the users action is recognized based on a provided action recognition method and the action recognition model.

FIG. 1 shows an implementation environment of an image coding method, an action recognition model training method, and an action recognition method according to an embodiment of this application. The implementation environment includes an image coding device 101, a model training device 102, and an action recognition device 103.

The image coding device 101 can extract, based on a plurality of groups of human skeleton data collected by a motion sensing collection device, a motion feature matrix corresponding to the plurality of groups of human skeleton data, and then encode the motion feature matrix to obtain a motion feature image. The image coding device 101 may be a server, or may be a terminal. This embodiment of this application sets no specific limitation on the image coding device 101. The motion sensing collection device may be a kinect camera or the like. The kinect camera can provide a real-time depth image according to a structural optical principle. Based on the depth image provided by the kinect camera, human skeleton data can be obtained by using a random forest algorithm. The random forest algorithm is a classifier that includes a plurality of decision trees, and a class output by using the random forest algorithm is determined by a class of an individual tree.

The model training device 102 has a model training capability, and may perform training based on the motion feature image obtained through encoding by the image coding device 101, to obtain an action recognition model. The model training device 102 may be a server, or may be a terminal. This embodiment of this application sets no specific limitation on the model training device 102.

The action recognition device 103 has an image collection function, and can collect human skeleton data in real time. The action recognition device 103 also has a calculation processing capability, and may recognize an action of a user based on an action recognition model obtained through training by the model training device 102 and the collected human skeleton data. To implement an image collection function, the action or behavior recognition device 103 may be paired with another motion sensing collection device, and may further have a built-in skeleton information collection unit, where the skeleton information collection unit has a same function as the motion sensing device. In actual application, the action recognition device 103 may be a home child care-giving robot, a dangerous action monitoring device in a public place, a human-computer interaction game device, or the like.

Figure 2:
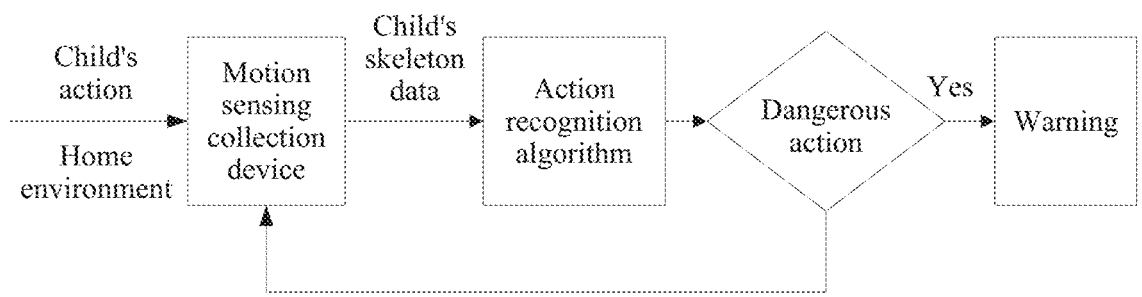
FIG. 2 is a schematic diagram of an application scenario of an action recognition method according to an embodiment of this application.

For example, the action recognition device 103 in FIG. 1 is a home child care-giving robot, and a kinect camera is disposed in the home child care-giving robot, mainly to prevent accidental injury of a child at home, for example, getting an electric shock due to touching a socket or falling after climbing to a higher place. FIG. 2 is a diagram of a working procedure of a home child care-giving robot. Referring to FIG. 2, the home child care-giving robot collects an action image of a child in a home environment in real time by using a kinect camera, identifies human skeleton data of the child by using an algorithm of the kinect, and then recognizes an action of the child in real time based on the human skeleton data. When determining that the action of the child is a dangerous action, the home child care-giving robot sends a warning immediately to attract a family member's attention; otherwise, the home child care-giving robot continues to obtain human skeleton data by using the kinect, so as to monitor the action of the child.

Figure 3:
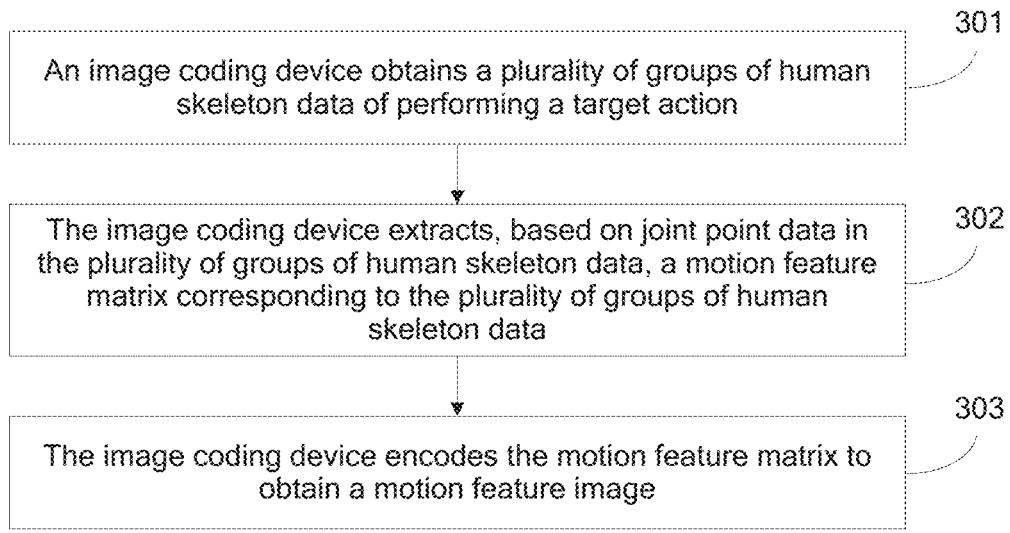
FIG. 3 is a flowchart of an image coding method according to an embodiment of this application.

An embodiment of this application provides an image coding method. For example, an image coding device performs this embodiment of this application. Referring to FIG. 3, a method procedure provided in this embodiment of this application includes the following steps.

301. An image coding device obtains a plurality of groups of human skeleton data of performing a target action, where each group of human skeleton data includes joint point data of performing the target action.

The target actions include a stoop action, an action of standing at attention, an action of lifting a hand leftwards, an action of lifting a hand rightwards, and the like. When an action executor performs the target action, a quantity of groups of obtained human skeleton data may be determined based on complexity of the target action. A more complex target action comes with a larger quantity of groups of obtained human skeleton data, and a simpler target action comes with a smaller quantity of groups of obtained human skeleton data. The plurality of groups of obtained human skeleton data may be consecutive human skeleton data, or may be a plurality of groups of inconsecutive human skeleton data selected from a plurality of groups of consecutive human skeleton data according to a preset rule. This is not specifically limited in this embodiment of this application. The preset rule may be selecting at an interval of one group of human skeleton data, selecting at an interval of two groups of human skeleton data, or the like. For example, a stoop action includes 44 groups of consecutive human skeleton data. In this embodiment of this application, the 44 groups of consecutive human skeleton data may be used as 44 groups of obtained human skeleton data of performing the stoop action; or 22 groups of human skeleton data such as a first group of human skeleton data, a third group of human skeleton data, a fifth group of human skeleton data, . . . , and a $43^{th}$ group of human skeleton data may be used as 22 groups of obtained human skeleton data of performing the stoop action.

Figure 4:
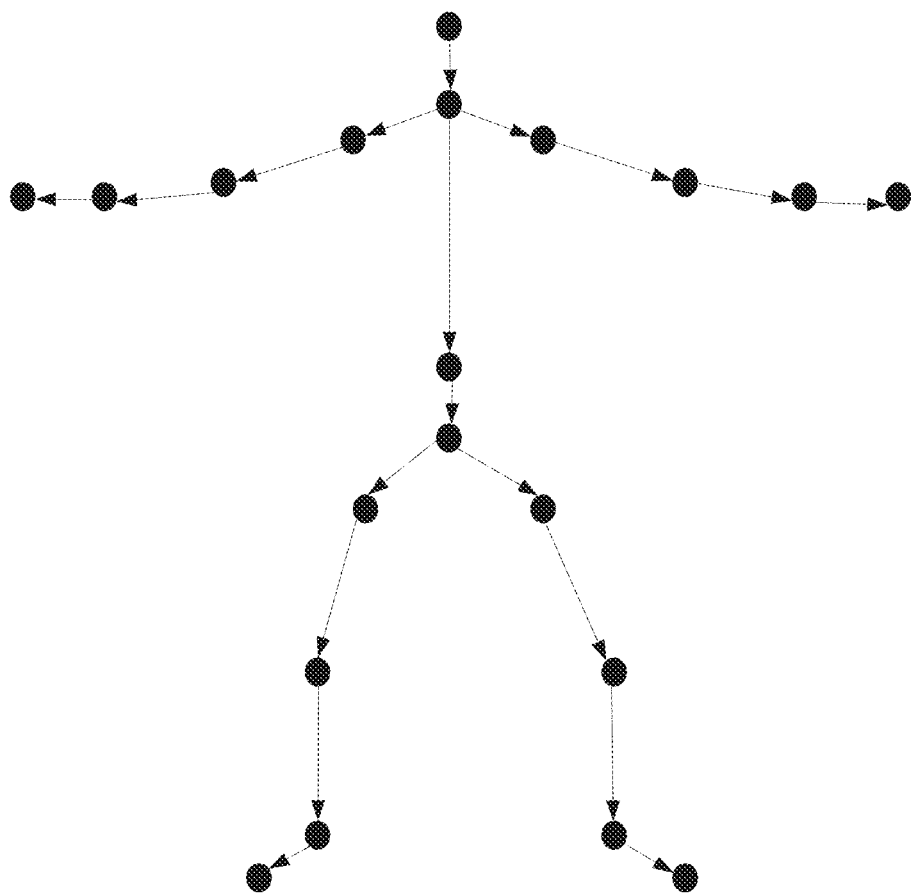
FIG. 4 is a schematic diagram of main joint points of a human skeleton according to an embodiment of this application.

The joint point may be all joint points included in a human skeleton, or may be a main joint point that plays a key role in action recognition. To reduce a calculation amount, in this embodiment of this application, a preset quantity of joint points may be selected for calculation. The preset quantity may be 20, 25, or the like. This embodiment of the present invention sets no specific limitation on the preset quantity. Referring to FIG. 4, when a quantity of joint points is 20, the 20 joint points include a head joint point, a shoulder center joint point, a left shoulder joint point, a left elbow joint point, a left hand joint point, a right shoulder joint point, a right elbow joint point, a right hand joint point, a spine joint point, a hip center joint point, a left hip joint point, a right hip joint point, a left knee joint point, a right knee joint point, a left ankle joint point, a right ankle joint point, a left foot joint point, and a right foot joint point.

302. The image coding device extracts, based on joint point data in the plurality of groups of human skeleton data, a motion feature matrix corresponding to the plurality of groups of human skeleton data.

The motion feature matrix includes a linear velocity matrix or an angular velocity matrix. According to different motion feature matrices, that the image coding device extracts, based on the joint point data in the plurality of groups of human skeleton data, a motion feature matrix corresponding to the plurality of groups of human skeleton data may include but is not limited to the following two cases.

In a first case, the motion feature matrix includes a linear velocity matrix, and the joint point data includes coordinates of a corresponding joint point in a three-dimensional coordinate system. In this case, the image coding device may perform the following steps to extract, based on the joint point data in the plurality of groups of human skeleton data, the motion feature matrix corresponding to the plurality of groups of human skeleton data:

30211. The image coding device subtracts coordinates of a joint point in a first group of human skeleton data in the three-dimensional coordinate system from coordinates of the corresponding joint point in a second group of human skeleton data in the three-dimensional coordinate system to obtain linear velocity units corresponding to the first group of human skeleton data.

Before this step is performed, in this embodiment of this application, a three-dimensional coordinate system needs to be established, and based on the established three-dimensional coordinate system, the image coding device can obtain coordinates of a joint point in each group of human skeleton data in the three-dimensional coordinate system. For M joint points of N groups of human skeleton data, coordinates of each joint point in the three-dimensional coordinate system are $P_t^i = (p_x, p_y, p_z)$.

Herein, i is the $i^{th}$ joint point, a value range of i is [1, M], t is a $t^{th}$ group of human skeleton data, a value range of t is [1, N], and $p_x$, $p_y$, and $p_z$ are coordinates of the $i^{th}$ joint point in an X-axis direction, a Y-axis direction, and a Z-axis direction.

N groups of human skeleton data that include M joint points may be represented by using an N×M×3 matrix. For example, for a stoop action, 44 groups of human skeleton data may be obtained, each group of human skeleton data includes 20 pieces of joint point data of performing the stoop action, and the 44 groups of human skeleton data may be represented by using a 44×20×3 matrix. Coordinates of 20 joint points in the $1^{st}$ group of human skeleton data in a three-dimensional coordinate system are (−0.6197, 0.3280, 3.1819), (−0.6204, 0.3820, 3.1629), (−0.6255, 0.6453, 3.0822), (−0.6614, 0.8672, 2.9904). (−0.8062, 0.5685, 3.0942), (−0.8786, 0.3563, 3.1360), (−0.8830, 0.1673, 3.1266), (−0.9009, 0.1085, 3.1476), (−0.5482, 0.6521, 3.1190), (−0.4806, 0.4419, 3.2474), (−0.4548, 0.2069, 3.2755), (−0.4420, 0.1354, 3.2706), (−0.6727, 0.2509, 3.1807), (−0.7282, −0.1948, 3.229), (−0.7292, −0.5496, 3.4253), (−0.7618, −0.6072, 3.3867), (−0.5636, 0.2808, 3.2195), (−0.6295, −0.2032, 3.4010), (−0.6533, −0.5380, 3.4876), and (−0.6111, −0.5965, 3.5122); coordinates of 20 joint points in the $2^{nd}$ group of human skeleton data in the three-dimensional coordinate system are (−0.6173, 0.3269, 3.1828), (−0.6181, 0.3813, 3.1635), (−0.6306, 0.6889, 3.0651), (−0.6591, 0.8689, 2.9900), (−0.8029, 0.5767, 3.0945), (−0.8761, 0.3543, 3.1334), (−0.8702, 0.1630, 3.1079), (−0.8705, 0.1008, 3.1136), (−4.5461, 0.6517, 3.1196), (−0.4783, 0.4416, 3.2485), (−0.4544, 0.2077, 3.2763), (−0.4396, 0.1362, 3.2724), (−0.6702, 0.2514, 3.1821), (−0.7256, −0.1930, 3.3226), (−0.7288, −0.5498, 3.4245), (−0.7630, −0.5859, 3.3605), (−0.5615, 0.2807, 3.2189), (−0.6285, −0.2010, 3.3994), (−0.6541, −0.5380, 3.4877), and (−0.6301, −0.5980, 3.4545); . . . ; coordinates of 20 joint points in the $44^{th}$ group of human skeleton data in the three-dimensional coordinate system are (0.1460, 0.2145, 2.1690), (0.1428, 0.1927, 2.1485), (0.1210, 0.5332, 2.0699), (0.1993, 0.6894, 1.9873), (−0.0031, 0.4087, 2.0452), (−0.0944, 0.1501, 2.0784), (−0.1050, −0.0680, 2.1074), (−0.0945, −0.1476, 2.1227), (0.2512, 0.4655, 2.2222), (0.2743, 0.2475, 2.3574), (0.3129, 0.0278, 2.5084), (0.3781, −0.0206, 2.5579). (0.0911, 0.0540, 2.1466), (0.0969, −0.4015, 2.2515), (0.1133, −0.7766, 2.3625), (0.1721, −0.8567, 2.3584), (0.2090, 0.0647, 2.2219), (0.2538, −0.3598, 2.3791), (0.0210, −0.5750, 2.6110), and (0.0572, −6798, 2.6159). Finally, a matrix shown in FIG. 5 may be obtained.

The image coding device subtracts the coordinates of the joint point in the first group of human skeleton data in the three-dimensional coordinate system from the coordinates of the corresponding joint point in the second group of human skeleton data in the three-dimensional coordinate system based on an established coordinate matrix, and the linear velocity units corresponding to the first group of human skeleton data can be obtained. The first group of human skeleton data and the second group of human skeleton data are any two adjacent groups of human skeleton data in the plurality of groups of human skeleton data, and the first group of human skeleton data is a previous group of human skeleton data of the second group of human skeleton data.

For an $r^{th}$ group of human skeleton data and an $(r+1)^{th}$ group of human skeleton data, coordinates of a joint point i in the $r^{th}$ group of human skeleton data in the three-dimensional coordinate system are $P_r^i$, and coordinates of the joint point i in the $(r+1)^{th}$ group of human skeleton data in the three-dimensional coordinate system are $P_{r+1}^i$. The image coding device may subtract $P_r^i$ from $P_{r+1}^i$ to obtain a coordinate difference of the joint point i: $v_r^i = P_{r+1}^i - P_r^i$, where a value of r is [1, N−1]. A coordinate difference of each joint point in the $r^{th}$ group of human skeleton data and the $(r+1)^{th}$ group of human skeleton data is calculated in this manner, and a linear velocity unit corresponding to the $r^{th}$ group of human skeleton data is formed by using coordinate differences of M main joint points. The linear velocity unit is actually an M×3 matrix.

30212. The image coding device forms, by using all the obtained linear velocity units, a linear velocity matrix corresponding to the plurality of groups of human skeleton data.

For N groups of human skeleton data, N−1 linear velocity units may be obtained by subtracting coordinates of a joint point in a previous group of human skeleton data in the three-dimensional coordinate system from coordinates of the corresponding joint point in a current group of human skeleton data in the three-dimensional coordinate system. Each linear velocity unit is a matrix with an order of M×3, and therefore a linear velocity matrix corresponding to the N groups of human skeleton data may be represented by using one (N−1)×M−3 matrix.

Figure 5:
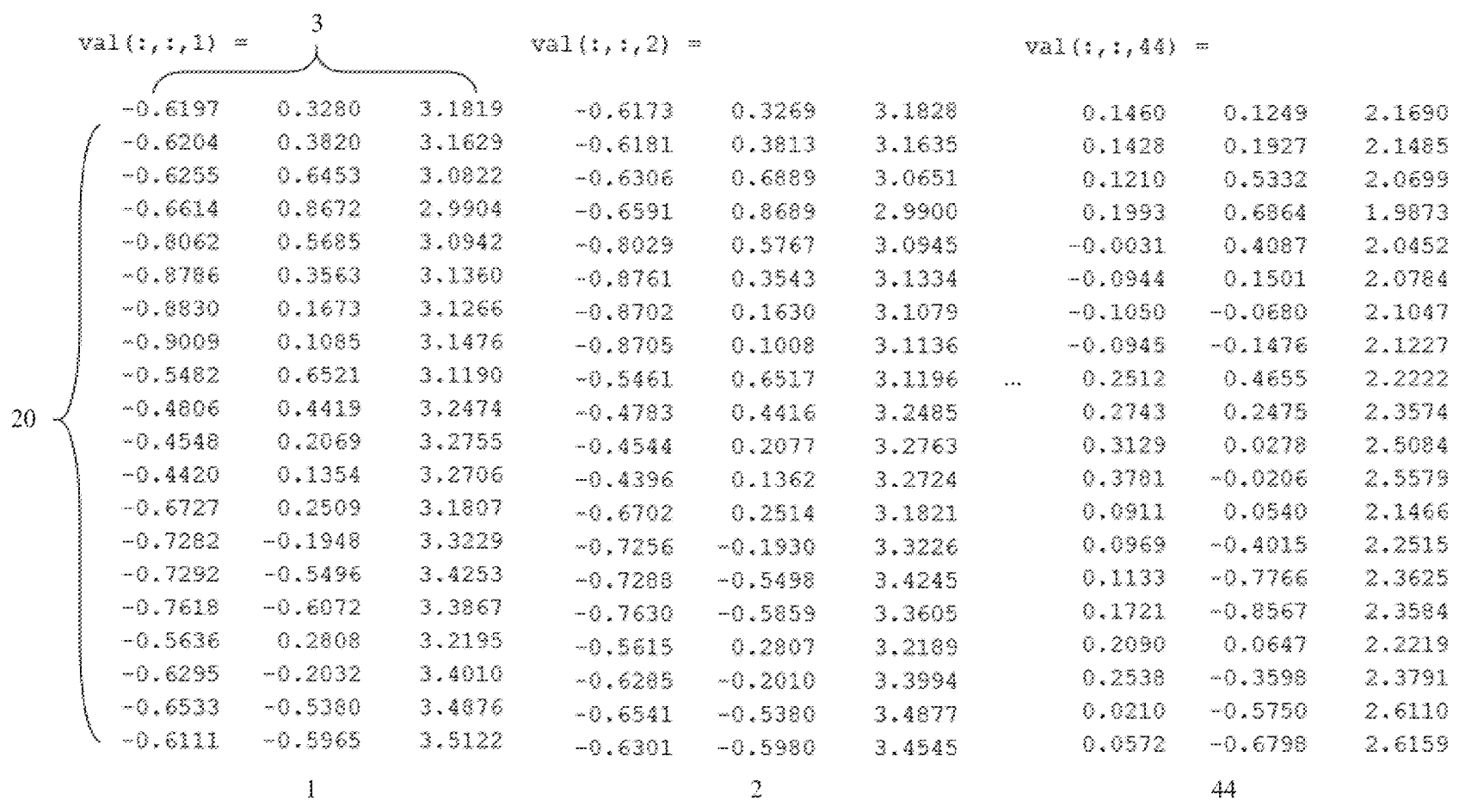
Figure 6:
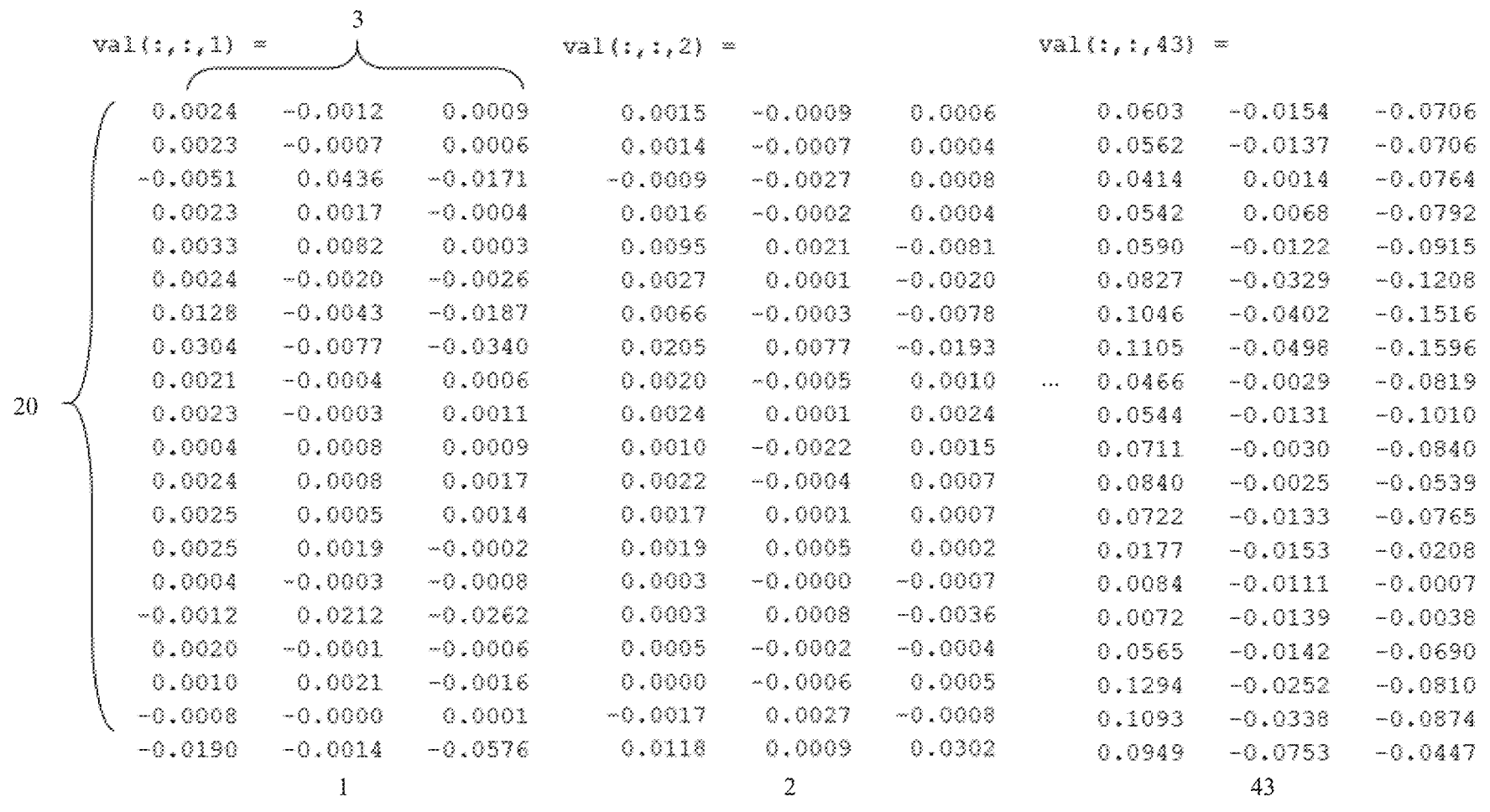

For example, for the coordinate matrix corresponding to the stoop action shown in FIG. 5, a 43×20×3 matrix shown in FIG. 6 may be obtained by subtracting coordinates of a joint point in a previous group of human skeleton data in the three-dimensional coordinate system from coordinates of the corresponding joint point in a current group of human skeleton data in the three-dimensional coordinate system.

In a first case, the motion feature matrix includes an angular velocity matrix, and the joint point data includes coordinates of a corresponding joint point in a three-dimensional coordinate system. In this case, the image coding device may perform the following steps to extract, based on the joint point data in the plurality of groups of human skeleton data, the motion feature matrix corresponding to the plurality of groups of human skeleton data:

30221. The image coding device calculates direction angles of joint points of the plurality of groups of human skeleton data in the three-dimensional coordinate system based on coordinates of the joint points of the plurality of groups of human skeleton data in the three-dimensional coordinate system.

For the joint point i in the $t^{th}$ group of human skeleton data, it is assumed that a direction angle of the joint point i in an X-axis direction is α, a direction angle of the joint point i in a Y-axis direction is β, and a direction angle of the joint point i in a Z-axis direction is γ. The direction angles of the joint point i are:

$$\Phi_t^i = \begin{bmatrix} \alpha \\ \beta \\ \gamma \end{bmatrix} = \begin{bmatrix} \arccos \frac{p_x}{\sqrt{p_x^2 + p_y^2 + p_z^2}} \\ \arccos \frac{p_y}{\sqrt{p_x^2 + p_y^2 + p_z^2}} \\ \arccos \frac{p_z}{\sqrt{p_x^2 + p_y^2 + p_z^2}} \end{bmatrix},$$

where
a value range of i is [1, M], and a value range of t is [1, N].

30222. The image coding device subtracts direction angles of a joint point in a first group of human skeleton data in the three-dimensional coordinate system from direction angles of the corresponding joint point in a second group of human skeleton data in the three-dimensional coordinate system to obtain angular velocity units corresponding to the first group of human skeleton data.

The first group of human skeleton data and the second group of human skeleton data are any two adjacent groups of human skeleton data, and the first group of human skeleton data is a previous group of human skeleton data of the second group of human skeleton data.

For an $r^{th}$ group of human skeleton data and an $(r+1)^{th}$ group of human skeleton data, direction angles of a joint point i in the $r^{th}$ group of human skeleton data in the three-dimensional coordinate system are $\Phi_r^i$, direction angles of the joint point i in the $(r+1)^{th}$ group of human skeleton data in the three-dimensional coordinate system are $\Phi_{r+1}^i$, an angle difference of the joint point i in the $r^{th}$ group of human skeleton data may be obtained by subtracting $\Phi_r^i$ from $\Phi_{r+1}^i$, and the angle difference is $\omega_r^i = \Phi_{r+1}^i - \Phi_r^i$, where a value of r is [1, N−1]. An angle difference of each joint point in the $r^{th}$ group of human skeleton data and the $(r+1)^{th}$ group of human skeleton data is calculated in this manner, and an angular velocity unit corresponding to the $r^{th}$ group of human skeleton data is formed by using angle differences of M main joint points. The angular velocity unit is actually an M×3 matrix.

30223. The image coding device forms, by using all the obtained angular velocity units, an angular velocity matrix corresponding to the plurality of groups of human skeleton data.

For N groups of human skeleton data, N−1 angular velocity units may be obtained by subtracting direction angles of a joint point in a previous group of human skeleton data in the three-dimensional coordinate system from direction angles of the corresponding joint point in a current group of human skeleton data in the three-dimensional coordinate system. Each angular velocity unit is a matrix with an order of M×3, and therefore an angular velocity matrix corresponding to the N groups of human skeleton data may be represented by using one (N−1)×M×3 matrix.

Figure 7:
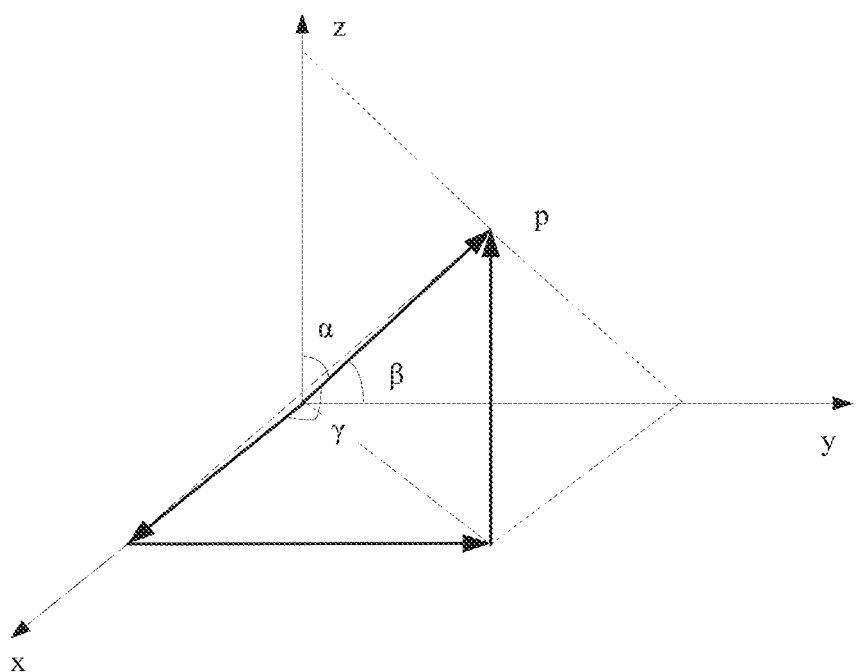
FIG. 7 is a schematic diagram of a spatial angle of a three-dimensional coordinate system according to an embodiment of this application.

For example, for the coordinate matrix corresponding to the stoop action shown in FIG. 5, a 43×20×3 matrix shown in FIG. 7 may be obtained by subtracting direction angles of a joint point in a previous group of human skeleton data in the three-dimensional coordinate system from direction angles of the corresponding joint point in a current group of human skeleton data in the three-dimensional coordinate system.

303. The image coding device encodes the motion feature matrix to obtain a motion feature image.

If a different motion feature matrix is extracted in step 302, a different motion feature image is obtained through encoding by the image coding device. There may be the following two cases when the image coding device encodes different motion feature matrices.

In a first case, the motion feature matrix is a linear velocity matrix.

In this case, that the image coding device encodes the motion feature matrix to obtain a motion feature image includes but is not limited to the following steps 30311 to 30313.

30311. The image coding device preprocesses the linear velocity matrix.

That the image coding device preprocesses the linear velocity matrix includes the following steps:

Step 1: The image coding device obtains a maximum linear velocity element value and a minimum linear velocity element value in the linear velocity matrix.

Step 2: The image coding device performs normalization processing on each linear velocity element value in the linear velocity matrix based on the maximum linear velocity element value and the minimum linear velocity element value, to obtain a normalized linear velocity matrix.

Each linear velocity element value in the normalized linear velocity matrix is between a first value and a second value, and the first value is less than the second value. In this embodiment of this application, the first value is 0, and the second value is 255.

It is assumed that the maximum linear velocity element value obtained from the linear velocity matrix is max(X) and the minimum linear velocity element value obtained from the linear velocity matrix is min(X). Normalization processing may be performed for each linear velocity element value X in the linear velocity matrix by using the following formula, and a normalized linear velocity element value X is:

$$X_{norm} = \frac{X - \min(X)}{\max(X) - \min(X)} * 255.$$

When X is the maximum linear velocity element value in the linear velocity matrix. X−min(X) is equal to max(X)−min(X), and a value of $X_{norm}$ is 255. When X is the minimum linear velocity element value in the linear velocity matrix, X−min(X) is equal to 0, and a value of $X_{norm}$ is 0. When X is between the minimum linear velocity element value and the maximum linear velocity element value, a value of $X_{norm}$ is also between the first value and the second value.

30312. The image coding device encodes a plurality of linear velocity units in the preprocessed linear velocity matrix to obtain a plurality of linear velocity pixel frames.

The image coding device uses coordinates of a joint point in each preprocessed linear velocity unit in the three-dimensional coordinate system as image channels, and encodes a plurality of preprocessed linear velocity units to obtain a plurality of linear velocity pixel frames. Specifically, the image coding device randomly specifies coordinates of a joint point in each preprocessed linear velocity unit on an X axis, a Y axis, and a Z axis as R, Q and B image channels, and further encodes each linear velocity unit based on the specified image channels to obtain a plurality of linear velocity pixel frames. For example, the foregoing method may be used to encode a linear velocity matrix that includes N−1 linear velocity units, to obtain N−1 linear velocity pixel frames.

30313. The image coding device forms a linear velocity image by using the plurality of linear velocity pixel frames.

The image coding device forms, by using the plurality of linear velocity pixel frames, the linear velocity image based on a collection time sequence of human skeleton data corresponding to each linear velocity pixel frame.

In the image processing field, usually, one type of action includes 40 to 120 groups of human skeleton data. Some groups of human skeleton data include more action information. Pixel frames obtained by encoding the human skeleton data are referred to as key pixel frames. Key pixel frames are extracted from a plurality of pixel frames, helping reduce a calculation amount during subsequent image processing. A process of extracting a key pixel frame is as follows:

Step a: The image coding device calculates linear velocity energy change values of the plurality of linear velocity pixel frames based on the preprocessed linear velocity matrix.

A linear velocity energy function of the linear velocity matrix is defined in this embodiment of this application as:

$$E_r = \sum_{j=1}^{20} \|v_r^j\|^2.$$

A value range of r is [1, N−1]; j is a quantity of any joint points, and a value of j is [1, 20]; $\|v_i^j\|^2$ is a quadratic sum of coordinates of a $j^{th}$ joint point on the X axis, Y axis, and Z axis, and actually, $\|v_i^j\|^2$ is a quadratic sum of a linear velocity of the $j^{th}$ joint point; and $E_r$ is a linear velocity energy value of an $r^{th}$ linear velocity pixel frame, and is actually quadratic sums of linear velocities of 20 joint points in the $r^{th}$ group of human skeleton data.

According to the predefined linear velocity energy function, a derivative of the linear velocity energy function with respect to time is:

$$\delta E_r = E_{r+1} - E_r.$$

The following two points can be learned from the derivative formula of the linear velocity energy function with respect to time:

In a first point, a derivative of a linear velocity energy function of the $r^{th}$ linear velocity pixel frame with respect to time is actually equal to a linear velocity energy value of an $(r+1)^{th}$ linear velocity pixel frame minus the linear velocity energy value of the $r^{th}$ linear velocity pixel frame, namely, a linear velocity energy change value. Because a last linear velocity pixel frame does not have a next linear velocity pixel frame, N−2 linear velocity energy change values may be calculated for the first N−1 linear velocity pixel frames.

In a second point, a larger absolute value of the derivative indicates a larger change degree of an action and a larger information amount corresponding to a pixel frame. The pixel frame with a large information amount is actually the key pixel frame to be obtained in this embodiment of this application.

For specific implementation of this step, refer to steps (1) to (3).

(1) The image coding device calculates a quadratic sum of coordinates of each joint point in a first linear velocity pixel frame in the three-dimensional coordinate system, and adds up the quadratic sums of the coordinates of all the joint points in the three-dimensional coordinate system to obtain a linear velocity energy value of the first linear velocity pixel frame.

According to the defined linear velocity energy function, the image coding device may calculate the linear velocity energy value of the first linear velocity pixel frame by calculating the quadratic sum of the coordinates of each joint point in the first linear velocity pixel frame in the three-dimensional coordinate system, and adding up the quadratic sums of the coordinates of all the joint points in the three-dimensional coordinate system.

(2) The image coding device calculates a quadratic sum of coordinates of each joint point in a second linear velocity pixel frame in the three-dimensional coordinate system, and adds up the quadratic sums of the coordinates of all the joint points in the three-dimensional coordinate system to obtain a linear velocity energy value of the second linear velocity pixel frame.

According to the defined linear velocity energy function, the image coding device may calculate the linear velocity energy value of the second linear velocity pixel frame by calculating the quadratic sum of the coordinates of each joint point in the second linear velocity pixel frame in the three-dimensional coordinate system, and adding up the quadratic sums of the coordinates of all the joint points in the three-dimensional coordinate system.

The first linear velocity pixel frame and the second linear velocity pixel frame are any two adjacent linear velocity pixel frames, and the first linear velocity pixel frame is a previous linear velocity pixel frame of the second linear velocity pixel frame.

(3) The image coding device subtracts the linear velocity energy value of the first linear velocity pixel frame from the linear velocity energy value of the second linear velocity pixel frame to obtain a linear velocity energy change value of the first linear velocity pixel frame.

Step b: The image coding device extracts a plurality of key linear velocity pixel frames from the plurality of linear velocity pixel frames in descending order of the linear velocity energy change values.

After the plurality of linear velocity energy change values are calculated, the image coding device may sort the linear velocity energy change values of the plurality of linear velocity pixel frames in descending order of the linear velocity energy change values, and then extract the plurality of key linear velocity pixel frames from the plurality of linear velocity pixel frames based on a sorting result.

Based on the extracted plurality of key linear velocity pixel frames, the image coding device encodes the plurality of key linear velocity pixel frames in a time sequence to obtain a linear velocity picture. For example, for a stoop action, 44 groups of human skeleton data may be obtained and encoded as 43 linear velocity pixel frames. According to the linear velocity energy function, 32 key linear velocity pixel frames are extracted from the 43 linear velocity pixel frames, and are finally encoded as one linear velocity image that includes 32-20 pixels.

In a second case, the motion feature matrix is an angular velocity matrix.

In this case, that the image coding device encodes the motion feature matrix to obtain a motion feature image includes but is not limited to the following steps 30321 to 30323.

30321. The image coding device preprocesses the angular velocity matrix.

That the image coding device preprocesses the angular velocity matrix includes the following steps:

Step 1: The image coding device obtains a maximum angular velocity element value and a minimum angular velocity element value in the angular velocity matrix.

Step 2: The image coding device performs normalization processing on each angular velocity element value in the angular velocity matrix based on the maximum angular velocity element value and the minimum angular velocity element value, to obtain a normalized angular velocity matrix.

Each angular velocity element value in the normalized angular velocity matrix is between a first value and a second value, and the first value is less than the second value. In this embodiment of this application, the first value is 0, and the second value is 255.

It is assumed that the maximum angular velocity element value obtained from the angular velocity matrix is max(Y) and the minimum angular velocity element value obtained from the angular velocity matrix is min(Y). Normalization processing may be performed for each angular velocity element value Y in the linear velocity matrix by using the following formula, and a normalized linear velocity element value $Y_{norm}$ is:

$$Y_{norm} = \frac{Y - \min(Y)}{\max(Y) - \min(Y)} * 255.$$

When Y is the maximum angular velocity element value in the angular velocity matrix, Y−min(Y) is equal to max(Y)−min(Y), and a value of $Y_{norm}$ is 255. When Y is the minimum angular velocity element value in the angular velocity matrix, Y−min(Y) is equal to 0, and a value of $Y_{norm}$ is 0. When Y is between the minimum angular velocity element value and the maximum angular velocity element value, a value of $Y_{norm}$ is also between the first value and the second value.

30322. The image coding device encodes a plurality of angular velocity units in the preprocessed angular velocity matrix to obtain a plurality of angular velocity pixel frames.

The image coding device uses direction angles of a joint point in each preprocessed angular velocity unit in the three-dimensional coordinate system as image channels, and encodes a plurality of preprocessed angular velocity units to obtain a plurality of angular velocity pixel frames. Specifically, the image coding device randomly specifies direction angles of a joint point in each preprocessed angular velocity unit on an X axis, a Y axis, and a Z axis as R, and B image channels, and further encodes each angular velocity unit based on the specified image channels to obtain a plurality of angular velocity pixel frames. For example, the foregoing method may be used to encode an angular velocity matrix that includes N−1 angular velocity units, to obtain N−1 angular velocity pixel frames.

30323. The image coding device forms an angular velocity image by using the plurality of angular velocity pixel frames.

The image coding device forms, by using the plurality of angular velocity pixel frames, the angular velocity image based on a collection time sequence of human skeleton data corresponding to each angular velocity pixel frame.

In the image processing field, usually, one type of action includes 40 to 120 groups of human skeleton data. Some groups of human skeleton data include more action information. Pixel frames obtained by encoding the human skeleton data are referred to as key pixel frames. Key pixel frames are extracted from a plurality of pixel frames, helping reduce a calculation amount during subsequent image processing. A process of extracting a key pixel frame is as follows:

Step a: The image coding device calculates angular velocity energy change values of the plurality of linear velocity pixel frames based on the preprocessed angular velocity matrix.

An angular velocity energy function of the angular velocity matrix is defined in this embodiment of this application as:

$$E_r = \sum_{j=1}^{20} \|\omega_r^j\|^2.$$

A value range of r is [1, N−1]; j is a quantity of any joint points, and a value of j is [1, 20]; $\|\omega_r^j\|^2$ is a quadratic sum of coordinates of a $j^{th}$ joint point on the X axis, Y axis, and Z axis, and actually, $\|\omega_r^j\|^2$ is a quadratic sum of an angular velocity of the $j^{th}$ joint point; and $E_r$ is an angular velocity energy value of an $r^{th}$ linear velocity pixel frame, and is actually quadratic sums of angular velocities of 20 joint points in the $r^{th}$ group of human skeleton data.

Based on the predefined angular velocity energy function, a derivative of the angular velocity energy function with respect to time is:

$$\delta E_r = E_{r+1} - E_r.$$

The following two points can be learned from the derivative formula of the angular velocity energy function with respect to time:

In a first point, a derivative of an angular velocity energy function of the $r^{th}$ angular velocity pixel frame with respect to time is actually equal to an angular velocity energy value of an $(r+1)^{th}$ angular velocity pixel frame minus the angular velocity energy value of the $r^{th}$ angular velocity pixel frame, namely, an angular velocity energy change value. Because a last angular velocity pixel frame does not have a next angular velocity pixel frame, N−2 angular velocity energy change values may be calculated for the first N−1 angular velocity pixel frames.

In a second point, a larger absolute value of the derivative indicates a larger change degree of an action and a larger information amount corresponding to a pixel frame. The pixel frame with a large information amount is actually the key pixel frame to be obtained in this embodiment of this application.

For specific implementation of this step, refer to steps (1) to (3).

(1) The image coding device calculates a quadratic sum of direction angles of each joint point in a first angular velocity pixel frame in the three-dimensional coordinate system, and adds up the quadratic sums of the direction angles of all the joint points in the three-dimensional coordinate system to obtain a linear velocity energy value of the first angular velocity pixel frame.

According to the defined angular velocity energy function, the image coding device may calculate the angular velocity energy value of the first angular velocity pixel frame by calculating the quadratic sum of the direction angles of each joint point in the first angular velocity pixel frame in the three-dimensional coordinate system, and adding up the quadratic sums of the direction angles of all the joint points in the three-dimensional coordinate system.

(2) The image coding device calculates a quadratic sum of direction angles of each joint point in a second linear velocity pixel frame in the three-dimensional coordinate system, and adds up the quadratic sums of the direction angles of all the joint points in the three-dimensional coordinate system to obtain an angular velocity energy value of the second angular velocity pixel frame.

According to the defined angular velocity energy function, the image coding device may calculate the linear velocity energy value of the second angular velocity pixel frame by calculating the quadratic sum of the direction angles of each joint point in the second angular velocity pixel frame in the three-dimensional coordinate system, and adding up the quadratic sums of the direction angles of all the joint points in the three-dimensional coordinate system.

The first angular velocity pixel frame and the second angular velocity pixel frame are any two adjacent angular velocity pixel frames, and the first angular velocity pixel frame is a previous angular velocity pixel frame of the second angular velocity pixel frame.

(3) The image coding device subtracts the angular velocity energy value of the first linear velocity pixel frame from the linear velocity energy value of the second linear velocity pixel frame to obtain an angular velocity energy change value of the first angular velocity pixel frame.

Step b: The image coding device extracts a plurality of key angular velocity pixel frames from the plurality of angular velocity pixel frames in descending order of the angular velocity energy change values.

After the plurality of angular velocity energy change values are calculated, the image coding device may sort the angular velocity energy change values of the plurality of angular velocity pixel frames in descending order of the angular velocity energy change values, and then extract the plurality of key angular velocity pixel frames from the plurality of angular velocity pixel frames based on a sorting result.

Based on the extracted plurality of key angular velocity pixel frames, the image coding device may encode the plurality of key angular velocity pixel frames in a time sequence to obtain an angular velocity picture. For example, for a stoop action, 44 groups of human skeleton data may be obtained and encoded as 43 angular velocity pixel frames. According to the angular velocity energy function, 32 key angular velocity pixel frames are extracted from the 43 angular velocity pixel frames, and are finally encoded as one angular velocity image that includes 32×20 pixels.

In this application, at least one motion feature image, obtained through encoding, of the target action may be used to perform training to obtain an action recognition model. For example, the image coding device inputs the at least one motion feature image of the target action and an identifier of the target action into a convolutional neural network CNN model, and may perform training to obtain an action recognition model.

According to the method provided in this embodiment of this application, the motion feature matrix corresponding to the plurality of groups of human skeleton data is extracted, and then the extracted motion feature matrix corresponding to the plurality of groups of human skeleton data is encoded as the motion feature image. Because a data amount of the motion feature image is smaller than a data amount of a plurality of action feature vector sequences, consumption of storage resources and calculation resources is reduced.

Figure 9:
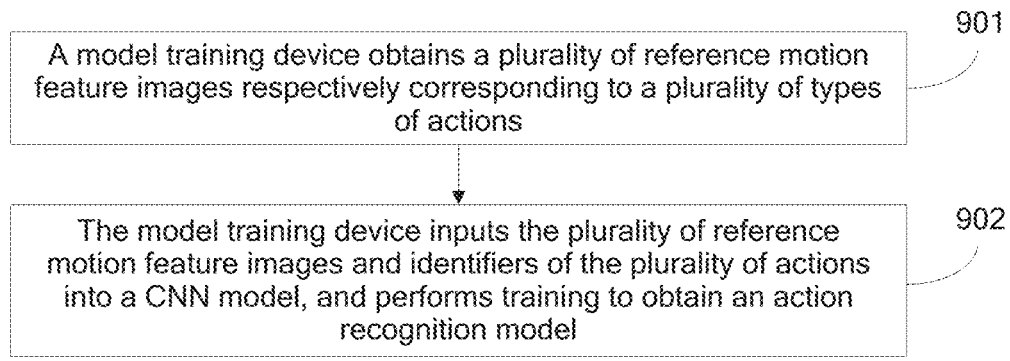
FIG. 9 is a flowchart of an action recognition model training method according to an embodiment of this application.

An embodiment of this application provides an action recognition model training method. That a model training device performs this application is used as an example. Referring to FIG. 9, a method procedure provided in this embodiment of this application includes the following steps.

901. The model training device obtains a plurality of reference motion feature images respectively corresponding to a plurality of types of actions.

The plurality of actions include a stoop action, a head lowering action, an action of lifting a hand leftwards, an action of lifting a hand rightwards, and the like. A reference motion feature image corresponding to each type of action may be obtained through encoding by using the image coding method shown in FIG. 3.

902. The model training device inputs the plurality of reference motion feature images and identifiers of the plurality of actions into a CNN model, and performs training to obtain an action recognition model.

Figure 10:
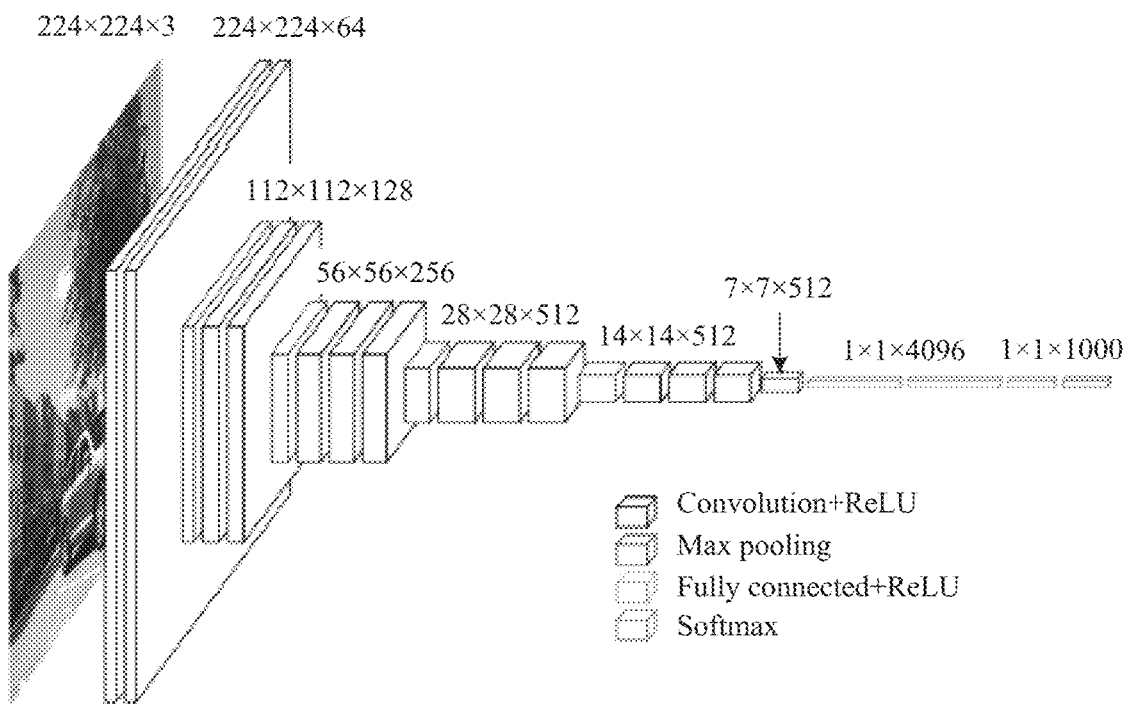
FIG. 10 is a schematic diagram of a CNN model according to an embodiment of this application.

In this embodiment of this application, a VGG 16 network structure is used to train a CNN model. The network structure is shown in FIG. 10, and includes five convolutional layers, five pooling layers, and two fully connected layers. One maximum pooling layer is disposed after each convolutional layer. A convolution operation needs to be performed on a feature (namely, a matrix) and several filtering templates at each convolutional layer or fully connected layer, and an output of the layer is an input of a next layer. The pooling layer is responsible for compressing an output feature, so as to ensure that the feature is highly compact. A weight of a filtering template, as a parameter, may be continuously updated iteratively in a training process of the CNN, and a final output of the CNN may be a multidimensional vector for encoding an original input image. Through a corresponding mathematical transformation, the multidimensional vector directly corresponds to a probability description of classifying the object. As shown in FIG. 7, an input of a VGG 16 network is a 224×224×3 color image, and after being input into the network, the image first passes through the first convolutional layer (convolution+ReLU). A convolution kernel of the layer is 3×3×64. Therefore, after passing through the first convolutional layer, the input 224×224×3 image becomes a 224×224×64 image. After the image passes through the first maximum pooling layer (max pooling), a size of the image decreases by half, and the image becomes a 112×112×64 image. After passing through the second convolutional layer (convolution+ReLU) whose convolution kernel is 3×3×128, the input 112×112×64 image becomes a 112×112×128 image. After the image passes through the second maximum pooling layer (max pooling), a size of the image decreases by half, and the image becomes a 56×56×128 image. A size of a convolution kernel of the third convolutional layer is 3×3×256, a size of a convolution kernel of the fourth convolutional layer is 3×3×512, a size of a convolution kernel of the fifth convolutional layer is 3×3×512, and so on. After the image passes through five convolutional layers and five maximum pooling layers, a size of an output image is 7×7×512. The 7×7×512 image is input into the first fully connected layer, and may be compressed into a 1×1×4096 image. Then the 1×1×40% image is input into the second fully connected layer, and may be compressed into a 1×1×1000 image. In other words, there are 1000 possible classes of the image. The VGG 16 network structure is designed for the 224×224×3 image, and is used to classify the image into 1000 classes. A 32×32×3 image is input in this application, and a quantity of action classes that need to be recognized in this application does not reach 1000. Therefore, to reduce a calculation amount and shorten a recognition time in a modeling and application process, the VGG 16 network structure needs to be modified in this application: the first fully connected layer is changed from 1×1×4096 to 1×1×512, and the second fully connected layer is changed from 1×1×1000 to a corresponding quantity of action classes. For example, if 20 action classes need to be recognized in this application, the second fully connected layer is changed from 1×1×1000 to 1×1×20; if 100 action classes need to be recognized, the second fully connected layer is changed from 1×1×1000 to 1×1×100.

Based on the modified VGG 16 network structure, the model training device may adjust model parameters of the CNN model by inputting a plurality of reference motion feature images and identifiers of a plurality of actions into the CNN model, and then use the CNN model corresponding to the obtained adjusted model parameters as the action recognition model. Considering that the motion feature image includes a linear velocity image and an angular velocity image, that the model training device inputs the plurality of reference motion feature images and the identifiers of the plurality of actions into the CNN model, and performs training to obtain the action recognition model may be inputting linear velocity images in the plurality of reference motion feature images and identifiers of corresponding actions into the CNN model, or may be inputting angular velocity images in the plurality of reference motion feature images and identifiers of corresponding actions into the CNN model, or may be inputting linear velocity images in the plurality of reference motion feature images and identifiers of corresponding actions, and angular velocity images in the plurality of reference motion feature images and identifiers of corresponding actions into the CNN model. An action recognition model finally obtained through training varies with an input image. When only the linear velocity images are input, an action recognition model obtained through training can only recognize a linear velocity image. When only the angular velocity images are input, an action recognition model obtained through training can only recognize an angular velocity image. When both the linear velocity images and the angular velocity images are input, an action recognition model obtained through training can recognize both a linear velocity image and an angular velocity image.

In another implementation, to meet an input requirement of the CNN model, before inputting the plurality of reference motion feature images and the identifiers of the plurality of actions into the CNN model, the model training device further performs a zero padding operation on the reference motion feature images. During specific implementation, for an S×M×3 reference motion feature image, one S−[(S−M)/2]×3 all-zero matrix may be added to the left side and the right side of each reference motion feature image (which is actually adding grayscale pixels), so that the S×M×3 reference motion feature image finally becomes a motion feature image whose pixel quantity is S×S. For example, for a stoop action, after processing in steps 301 and 302, a 32×20×3 motion feature image may be obtained, and one 32×6×3 all-zero matrix is added to the left side and the right side of the motion feature image, so that the motion feature image finally becomes a 32×32×3 motion feature image.

According to the method provided in this embodiment of this application, an action recognition model is obtained through training based on a reference motion feature image, so that a calculation amount in a model training process is reduced while recognition accuracy is ensured.

Figure 11:
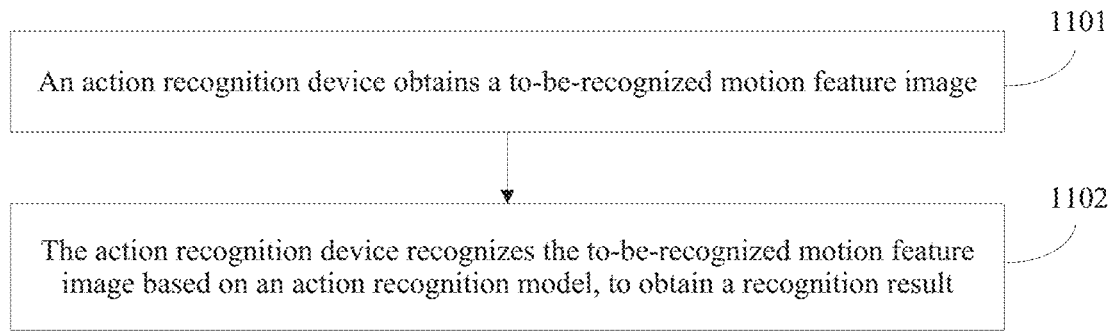
FIG. 11 is a flowchart of an action recognition method according to an embodiment of this application.

An embodiment of this application provides an action recognition method. That an action recognition device performs this application is used as an example. Referring to FIG. 11, a method procedure provided in this embodiment of this application includes the following steps.

1101. The action recognition device obtains a to-be-recognized motion feature image.

The to-be-recognized motion feature image is an image obtained by encoding a plurality of groups of to-be-recognized human skeleton data of a to-be-recognized action.

The action recognition device may perform the following steps to obtain the to-be-recognized motion feature image:

11011. The action recognition device collects the plurality of groups of to-be-recognized human skeleton data of performing the to-be-recognized action, where each group of to-be-recognized human skeleton data includes joint point data of performing the to-be-recognized action.

11012. The action recognition device extracts, based on joint point data in the plurality of groups of to-be-recognized human skeleton data, a to-be-recognized motion feature matrix corresponding to the plurality of groups of to-be-recognized human skeleton data.

In a first case, the to-be-recognized motion feature matrix includes a to-be-recognized linear velocity matrix, and the joint point data includes coordinates of a corresponding joint point in a three-dimensional coordinate system. That the action recognition device extracts, based on joint point data in the plurality of groups of to-be-recognized human skeleton data, a to-be-recognized motion feature matrix corresponding to the plurality of groups of to-be-recognized human skeleton data includes the following steps.

Step 1: The action recognition device subtracts coordinates of a joint point in a first group of to-be-recognized human skeleton data in the three-dimensional coordinate system from coordinates of the corresponding joint point in a second group of to-be-recognized human skeleton data in the three-dimensional coordinate system to obtain to-be-recognized linear velocity units of the first group of to-be-recognized human skeleton data.

The first group of to-be-recognized human skeleton data and the second group of to-be-recognized human skeleton data are any two adjacent groups of to-be-recognized human skeleton data in the plurality of groups of to-be-recognized human skeleton data, and the first group of to-be-recognized human skeleton data is a previous group of to-be-recognized human skeleton data of the second group of to-be-recognized human skeleton data.

Step 2: The action recognition device forms, by using all the obtained to-be-recognized linear velocity units, a to-be-recognized linear velocity matrix corresponding to the plurality of groups of to-be-recognized human skeleton data.

In a second case, the to-be-recognized motion feature matrix includes a to-be-recognized angular velocity matrix, and the joint point data includes coordinates of a corresponding joint point in a three-dimensional coordinate system. That the action recognition device extracts, based on joint point data in the plurality of groups of to-be-recognized human skeleton data, a to-be-recognized motion feature matrix corresponding to the plurality of groups of to-be-recognized human skeleton data includes the following steps.

Step 1: The action recognition device calculates direction angles of a joint point in the plurality of groups of to-be-recognized human skeleton data in the three-dimensional coordinate system based on a coordinate matrix corresponding to the plurality of groups of to-be-recognized human skeleton data.

Step 2: The action recognition device subtracts direction angles of a joint point in a first group of to-be-recognized human skeleton data in the three-dimensional coordinate system from direction angles of the corresponding joint point in a second group of to-be-recognized human skeleton data in the three-dimensional coordinate system to obtain to-be-recognized angular velocity units.

The first group of to-be-recognized human skeleton data and the second group of to-be-recognized human skeleton data are any two adjacent groups of to-be-recognized human skeleton data, and the first group of to-be-recognized human skeleton data is a previous group of to-be-recognized human skeleton data of the second group of to-be-recognized human skeleton data.

Step 3: The action recognition device forms, by using all the obtained to-be-recognized angular velocity units, a to-be-recognized angular velocity matrix corresponding to the plurality of groups of to-be-recognized human skeleton data.

11012. The action recognition device encodes the to-be-recognized motion feature matrix to obtain a to-be-recognized motion feature image.

When the motion feature matrix is a linear velocity matrix, the action recognition device may perform the following steps 1101211 to 1101213 to encode the to-be-recognized motion feature matrix to obtain a to-be-recognized motion feature image.

1101211. The action recognition device preprocesses the to-be-recognized linear velocity matrix.

When preprocessing the to-be-recognized linear velocity matrix, the action recognition device may obtain a maximum to-be-recognized linear velocity element value and a minimum to-be-recognized linear velocity element value in the to-be-recognized linear velocity matrix, and perform normalization processing on each to-be-recognized linear velocity element value in the to-be-recognized linear velocity matrix based on the maximum to-be-recognized linear velocity element value and the minimum to-be-recognized linear velocity element value, to obtain a normalized to-be-recognized linear velocity matrix.

Each to-be-recognized linear velocity element value in the normalized to-be-recognized linear velocity matrix is between a first value and a second value, and the first value is less than the second value. The first value is 0, and the second value is 255.

1101212. The action recognition device encodes a plurality of linear velocity units in the preprocessed to-be-recognized linear velocity matrix to obtain a plurality of to-be-recognized linear velocity pixel frames.

The action recognition device uses coordinates of a joint point in each preprocessed to-be-recognized linear velocity unit in the three-dimensional coordinate system as image channels, and encodes a plurality of preprocessed to-be-recognized linear velocity units to obtain a plurality of to-be-recognized linear velocity pixel frames.

To reduce a calculation amount of recognizing a to-be-recognized action, the action recognition device may further extract a plurality of to-be-recognized key linear velocity pixel frames from a plurality of to-be-recognized linear velocity pixel frames, and then form a to-be-recognized linear velocity image by using the plurality of to-be-recognized key linear velocity pixel frames. The plurality of to-be-recognized key linear velocity pixel frames may be extracted from the plurality of to-be-recognized pixel frames by using the following steps.

Step 1: The action recognition device calculates linear velocity energy change values of the plurality of to-be-recognized linear velocity pixel frames based on the preprocessed to-be-recognized linear velocity matrix.

Specifically, the action recognition device may calculate a quadratic sum of coordinates of each joint point in a first to-be-recognized linear velocity pixel frame in the three-dimensional coordinate system, and add up the quadratic sums of the coordinates of all the joint points in the three-dimensional coordinate system to obtain a linear velocity energy value of the first to-be-recognized linear velocity pixel frame. Then the action recognition device calculates a quadratic sum of coordinates of each joint point in a second to-be-recognized linear velocity pixel frame in the three-dimensional coordinate system, and adds up the quadratic sums of the coordinates of all the joint points in the three-dimensional coordinate system to obtain a linear velocity energy value of the second to-be-recognized linear velocity pixel frame. Further, the action recognition device subtracts the linear velocity energy value of the first to-be-recognized linear velocity pixel frame from the linear velocity energy value of the second to-be-recognized linear velocity pixel frame to obtain a linear velocity energy change value of the first to-be-recognized linear velocity pixel frame.

The first to-be-recognized linear velocity pixel frame and the second to-be-recognized linear velocity pixel frame are any two adjacent to-be-recognized linear velocity pixel frames, and the first to-be-recognized linear velocity pixel frame is a previous to-be-recognized linear velocity pixel frame of the second to-be-recognized linear velocity pixel frame.

Step 2: The action recognition device extracts a plurality of to-be-recognized key linear velocity pixel frames from the plurality of to-be-recognized linear velocity pixel frames in descending order of the linear velocity energy change values.

1101213. The action recognition device forms a to-be-recognized linear velocity image by using the plurality of to-be-recognized linear velocity pixel frames.

Certainly, if the plurality of to-be-recognized key linear velocity pixel frames are extracted, the action recognition device may form a to-be-recognized linear velocity image by using the plurality of to-be-recognized key linear velocity pixel frames.

When the motion feature matrix is an angular velocity matrix, the action recognition device may perform the following steps 1101221 to 1101223 to encode the to-be-recognized motion feature matrix to obtain a to-be-recognized motion feature image.

1101221. The action recognition device preprocesses the to-be-recognized angular velocity matrix.

When preprocessing the to-be-recognized angular velocity matrix, the action recognition device may obtain a maximum to-be-recognized angular velocity element value and a minimum to-be-recognized angular velocity element value in the to-be-recognized angular velocity matrix, and perform normalization processing on each to-be-recognized angular velocity element value in the to-be-recognized angular velocity matrix based on the maximum to-be-recognized angular velocity element value and the minimum to-be-recognized angular velocity element value, to obtain a normalized to-be-recognized angular velocity matrix.

Each to-be-recognized angular velocity element value in the normalized to-be-recognized angular velocity matrix is between a first value and a second value, and the first value is less than the second value. The first value is 0, and the second value is 255.

110122. The action recognition device encodes a plurality of angular velocity units in the preprocessed to-be-recognized angular velocity matrix to obtain a plurality of to-be-recognized angular velocity pixel frames.

The action recognition device uses direction angles of a joint point in each preprocessed to-be-recognized angular velocity unit in the three-dimensional coordinate system as image channels, and encodes a plurality of preprocessed to-be-recognized angular velocity units to obtain a plurality of to-be-recognized angular velocity pixel frames.

To reduce a calculation amount of recognizing a to-be-recognized action, the action recognition device may further extract a plurality of to-be-recognized key angular velocity pixel frames from a plurality of to-be-recognized angular velocity pixel frames, and then form a to-be-recognized angular velocity image by using the plurality of to-be-recognized key angular velocity pixel frames. The plurality of to-be-recognized key angular velocity pixel frames may be extracted from the plurality of to-be-recognized pixel frames by using the following steps.

Step 1: The action recognition device calculates angular velocity energy change values of the plurality of to-be-recognized angular velocity pixel frames based on the preprocessed to-be-recognized angular velocity matrix.

Specifically, the action recognition device may calculate a quadratic sum of direction angles of each joint point in a first to-be-recognized angular velocity pixel frame in the three-dimensional coordinate system, and add up the quadratic sums of the direction angles of all the joint points in the three-dimensional coordinate system to obtain an angular velocity energy value of the first to-be-recognized angular velocity pixel frame. Then the action recognition device calculates a quadratic sum of direction angles of each joint point in a second to-be-recognized angular velocity pixel frame in the three-dimensional coordinate system, and adds up the quadratic sums of the direction angles of all the joint points in the three-dimensional coordinate system to obtain an angular velocity energy value of the second to-be-recognized angular velocity pixel frame. Further, the action recognition device subtracts the angular velocity energy value of the first to-be-recognized angular velocity pixel frame from the angular velocity energy value of the second to-be-recognized angular velocity pixel frame to obtain an angular velocity energy change value of the first to-be-recognized angular velocity pixel frame.

The first to-be-recognized angular velocity pixel frame and the second to-be-recognized angular velocity pixel frame are any two adjacent to-be-recognized angular velocity pixel frames, and the first to-be-recognized angular velocity pixel frame is a previous to-be-recognized angular velocity pixel frame of the second to-be-recognized angular velocity pixel frame.

Step 2: The action recognition device extracts a plurality of to-be-recognized key angular velocity pixel frames from the plurality of to-be-recognized angular velocity pixel frames in descending order of the angular velocity energy change values.

110123. The action recognition device forms a to-be-recognized linear velocity image by using the plurality of to-be-recognized angular velocity pixel frames.

Certainly, if the plurality of to-be-recognized key angular velocity pixel frames are extracted, the action recognition device may form a to-be-recognized angular velocity image by using the plurality of to-be-recognized key angular velocity pixel frames.

1102. The action recognition device recognizes the to-be-recognized motion feature image based on an action recognition model, to obtain a recognition result.

The action recognition model is obtained through training based on a plurality of reference motion feature images respectively corresponding to a plurality of types of actions and identifiers of the plurality of types of actions, and the recognition result is used to indicate an action type of the to-be-recognized action.

Based on the obtained to-be-recognized motion feature image, the action recognition device may input the to-be-recognized motion feature image into the action recognition model to obtain the recognition result. When determining, based on the recognition result, that a to-be-recognized action is a specified dangerous action, the action recognition device sends a warning to warn another user, so as to avoid a dangerous event.

According to the method provided in this embodiment of this application, the to-be-recognized motion feature image is obtained, and then the to-be-recognized motion feature image is recognized based on the established action recognition model, so as to obtain the recognition result of the to-be-recognized action. Because a data amount of the motion feature image is smaller than a data amount of a plurality of action feature vector sequences, storage resources and calculation resources are greatly saved while recognition accuracy is ensured.

Figure 12:
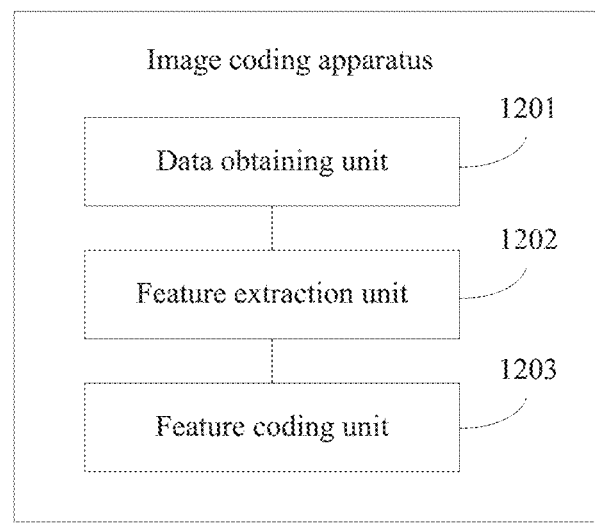
FIG. 12 is a schematic structural diagram of an image coding apparatus according to an embodiment of this application.

An embodiment of this application provides an image coding apparatus. Referring to FIG. 12, the apparatus includes a data obtaining unit 1201, a feature extraction unit 1202, and a feature coding unit 1203.

The data obtaining unit 1201 is configured to perform step 301 in FIG. 3.

The feature extraction unit 1202 is configured to perform step 302 in FIG. 3.

The feature coding unit 1203 is configured to perform step 303 in FIG. 3.

Figure 13:
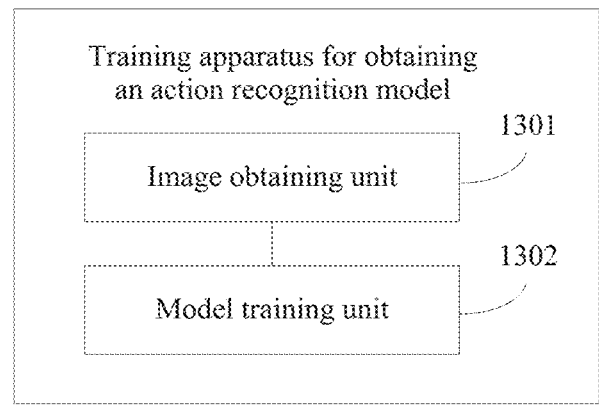
FIG. 13 is a schematic structural diagram of an action recognition model training apparatus according to an embodiment of this application.

An embodiment of this application provides an action recognition model training apparatus. Referring to FIG. 13, the apparatus includes an image obtaining unit 1301 and a model training unit 1302.

The image obtaining unit 1201 is configured to perform step 901 in FIG. 9.

The model training unit 1202 is configured to perform step 902 in FIG. 9.

An embodiment of this application provides an action recognition apparatus.

Figure 14:
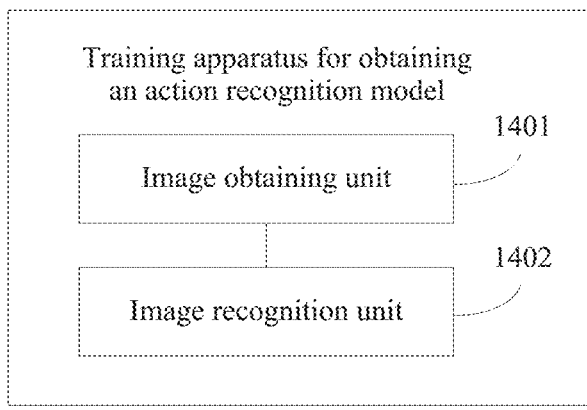
FIG. 14 is a schematic structural diagram of an action recognition apparatus according to an embodiment of this application.

Referring to FIG. 14, the apparatus includes an image obtaining unit 1401 and an image recognition unit 1402.

The image obtaining unit 1401 is configured to perform step 1101 in FIG. 11.

The model training unit 1402 is configured to perform step 1102 in FIG. 11.

Figure 15:
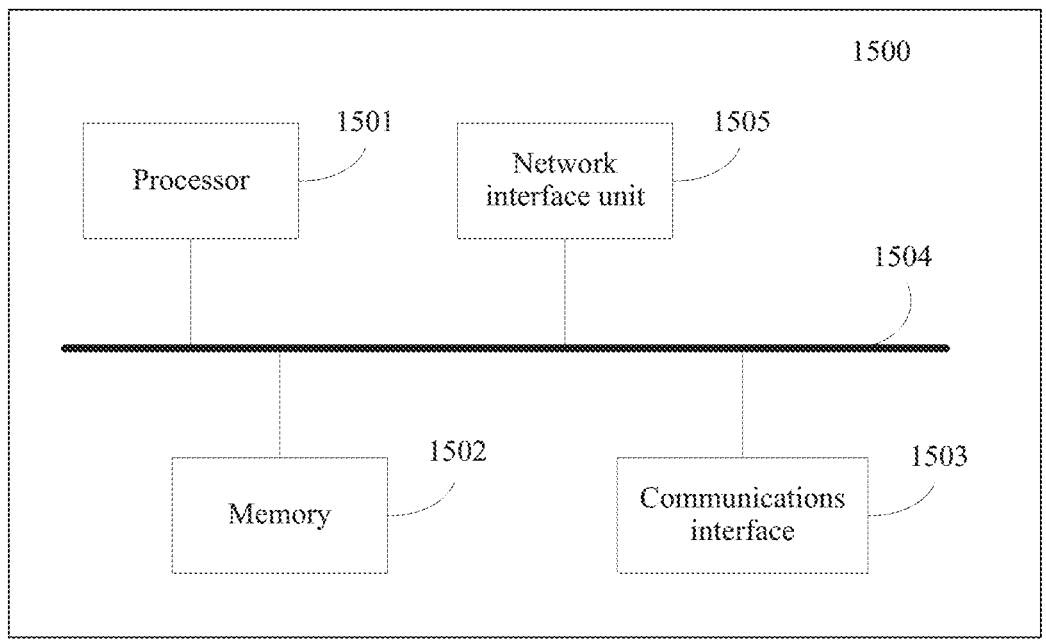
FIG. 15 is a schematic structural diagram of a computer device according to an embodiment of this application.

FIG. 15 shows a computer device 1500 used in an embodiment of this application. The computing device 1500 includes a processor 1501, a memory 1502, a communications interface 1503, and a bus 1504. The processor 1501, the memory 1502, and the communications interface 1503 are connected to each other by using the bus 1504. The computing device 1500 may be configured to perform the image coding method in FIG. 3, or may perform the action recognition model training method in FIG. 9, or may perform the action recognition method in FIG. 11.

The memory 1502 includes a computer storage medium. The computer storage medium includes volatile, nonvolatile, movable, and unmovable media that are configured to store information such as a computer-readable instruction, a data structure, a program module, or other data and that are implemented in any method or technology. The computer storage medium includes a RAM, a ROM, an EPROM, an EEPROM, a flash memory or another solid-state storage technology, a CD-ROM, a DVD or another optical storage, a cassette, a magnetic tape, a magnetic disk storage or another magnetic storage device. Certainly, a person skilled in the art may know that the computer storage medium is not limited to the foregoing several types.

According to various embodiments of this application, the computer device 1500 may be further connected by using a network such as the Internet to a remote computer on a network for running. To be specific, the computer device 1500 may be connected to the network by using a network interface unit 1505 connected to the bus 1504, or may be connected to another type of network or a remote computer system (not shown) by using a network interface unit 1505.

An embodiment of this application provides a computer-readable storage medium. The storage medium includes at least one instruction. When the instruction is run on a computer device, the computer device is enabled to perform the image coding method in FIG. 3, the action recognition model training method in FIG. 9, or the action recognition method in FIG. 11.

It should be noted that, when the image coding apparatus provided in the foregoing embodiments encodes an image, the action recognition model training apparatus trains an action recognition model, and the action recognition apparatus recognizes an action, the foregoing function module division is merely an example for description. In actual application, the foregoing functions may be allocated to different function modules for implementation according to a requirement, that is, an internal structure of the device is divided into different function modules, so as to complete all or some of the functions described above. In addition, the image coding method, the action recognition model training method, the action recognition method, the image coding apparatus, the action recognition model training apparatus, the action recognition apparatus, and the computer device provided in the foregoing embodiments belong to a same concept. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An image encoding method comprising:
   obtaining a plurality of groups of human skeleton data associated with performing an action by a human body, wherein each group of the human skeleton data comprises joint data associated with a joint for performing the action;

extracting, based on joint data in the plurality of groups of human skeleton data, a motion feature matrix corresponding to the plurality of groups of human skeleton data, wherein the motion feature matrix comprises a velocity matrix, wherein the velocity matrix is one of a linear velocity matrix or an angular velocity matrix; and encoding the motion feature matrix to obtain a motion feature image based on preprocessing the velocity matrix to determine a plurality of velocity units, wherein each velocity unit of the plurality of velocity units is encoded by using coordinates of a joint point in the velocity unit in a three-dimensional coordinate system as image channels, wherein the plurality of velocity units are one of a plurality of linear velocity units or a plurality of angular velocity units.

2. The method according to claim 1, wherein extracting the motion feature matrix comprises:

subtracting joint data in a first group of the plurality of groups of human skeleton data from a second group of the plurality of groups of human skeleton data immediately succeeding the first group of human skeleton data to obtain linear velocity units corresponding to the first group of human skeleton data; and forming, based on the linear velocity units, a linear velocity matrix corresponding to the plurality of groups of human skeleton data.

3. The method according to claim 2, wherein velocity matrix is a linear velocity matrix, wherein the plurality of velocity units are a plurality of linear velocity units, and wherein the encoding the motion feature matrix comprises:

encoding the plurality of linear velocity units to obtain a plurality of linear velocity pixel frames; and forming a linear velocity image at least a portion of the plurality of linear velocity pixel frames.

4. The method according to claim 3, wherein the at least a portion of the plurality of linear velocity pixel frames are a plurality of key linear velocity pixel frames extracted from the plurality of linear velocity pixel frames.

5. The method according to claim 4, wherein the plurality of key linear velocity pixel frames are extracted from the plurality of linear velocity pixel frames based on performing:

calculating linear velocity energy change values of the plurality of linear velocity pixel frames based on the preprocessed linear velocity matrix; and extracting the plurality of key linear velocity pixel frames from the plurality of linear velocity pixel frames in descending order of the linear velocity energy change values;

wherein the linear velocity energy change values are calculated based on performing:

calculating a quadratic sum of coordinates of each joint in a first linear velocity pixel frame in the three-dimensional coordinate system, and adding up the quadratic sum of the coordinates of each joint in the three-dimensional coordinate system to obtain a linear velocity energy value of the first linear velocity pixel frame;

calculating a quadratic sum of coordinates of each joint in a second linear velocity pixel frame in the three-dimensional coordinate system, and adding up the quadratic sums of the coordinates of each joint in the three-dimensional coordinate system to obtain a linear velocity energy value of the second linear velocity pixel frame immediately succeeding the first linear velocity pixel frame; and subtracting the linear velocity energy value of the first linear velocity pixel frame from the linear velocity energy value of the second linear velocity pixel frame to obtain a linear velocity energy change value of the first linear velocity pixel frame.

6. The method according to claim 1, wherein the preprocessing the linear velocity matrix comprises:

obtaining a maximum linear velocity element value and a minimum linear velocity element value in the linear velocity matrix; and performing normalization processing on each linear velocity element value in the linear velocity matrix based on the maximum linear velocity element value and the minimum linear velocity element value, to obtain a normalized linear velocity matrix, wherein each linear velocity element value in the normalized linear velocity matrix is between a first value and a second value, and the first value is less than the second value.

7. The method according to claim 1, wherein extracting the motion feature matrix corresponding to the plurality of groups of human skeleton data comprises:

calculating direction angles of joints in the plurality of groups of human skeleton data in the three-dimensional coordinate system based on coordinates of the joints in the plurality of groups of human skeleton data in the three-dimensional coordinate system;

subtracting direction angles of a joint in a first group of human skeleton data in the three-dimensional coordinate system from direction angles of the corresponding joint in a second group of human skeleton data in the three-dimensional coordinate system immediately succeeding the first group of human skeleton data to obtain angular velocity units; and forming, by using the obtained angular velocity units, the angular velocity matrix corresponding to the plurality of groups of human skeleton data.

8. The method according to claim 7, wherein the velocity matrix is an angular velocity matrix, wherein the plurality of velocity units are a plurality of angular velocity units, and wherein the encoding the motion feature matrix to obtain a motion feature image further comprises:

encoding the plurality of angular velocity units to obtain a plurality of angular velocity pixel frames; and forming an angular velocity image by using at least a portion of the plurality of angular velocity pixel frames.

9. The method according to claim 8, wherein the at least a portion of the plurality of angular velocity pixel frames are a plurality of key angular velocity pixel frames extracted from the plurality of angular velocity pixel frames.

10. The method according to claim 9, wherein the extracting the plurality of key angular velocity pixel frames comprises:

calculating angular velocity energy change values of the plurality of angular velocity pixel frames based on the preprocessed angular velocity matrix; and extracting the plurality of key angular velocity pixel frames from the plurality of angular velocity pixel frames in descending order of the angular velocity energy change values.

11. The method according to claim 10, wherein the calculating angular velocity energy change values of the plurality of angular velocity pixel frames based on the preprocessed angular velocity matrix comprises:

calculating a quadratic sum of direction angles of each joint in a first angular velocity pixel frame in the three-dimensional coordinate system, and adding up the quadratic sum of the direction angles of each joint in the three-dimensional coordinate system to obtain an angular velocity energy value of the first angular velocity pixel frame;

calculating a quadratic sum of direction angles of each joint in a second angular velocity pixel frame in the three-dimensional coordinate system, and adding up the quadratic sums of the direction angles of each joint in the three-dimensional coordinate system to obtain an angular velocity energy value of the second angular velocity pixel frame, wherein the first angular velocity pixel frame and the second angular velocity pixel frame are any two adjacent angular velocity pixel frames, and the first angular velocity pixel frame is a previous angular velocity pixel frame of the second angular velocity pixel frame; and subtracting the angular velocity energy value of the first angular velocity pixel frame from the angular velocity energy value of the second angular velocity pixel frame to obtain an angular velocity energy change value of the first angular velocity pixel frame.

12. The method according to claim 8, wherein the preprocessing the angular velocity matrix comprises:

obtaining a maximum angular velocity element value and a minimum angular velocity element value in the angular velocity matrix; and performing normalization processing on each angular velocity element value in the angular velocity matrix, based on the maximum angular velocity element value and the minimum angular velocity element value, to obtain a normalized angular velocity matrix.

13. An action recognition method, wherein the method comprises:

obtaining a motion feature image obtained by encoding a plurality of groups of human skeleton data of an action performed by a human body; and recognizing the motion feature image based on an action recognition model, to obtain a recognition result, wherein the action recognition model is obtained through training based on a plurality of reference motion feature images corresponding to a plurality of types of actions and identifiers of the plurality of types of actions, and the recognition result indicates an action type of the action; and wherein the obtaining the motion feature image comprises:

collecting the plurality of groups of human skeleton data of performing the action, wherein each group of the human skeleton data comprises joint data associated with a joint for performing the action;

extracting, based on joint data in the plurality of groups of human skeleton data, a motion feature matrix corresponding to the plurality of groups of human skeleton data, wherein the motion feature matrix comprises a velocity matrix, wherein the velocity matrix is one of a linear velocity matrix or an angular velocity matrix; and encoding the motion feature matrix to obtain the motion feature image based on preprocessing the velocity matrix to determine a plurality of velocity units, wherein each velocity matrix of the plurality of velocity units is encoded by using coordinates of a joint point in the velocity unit in a three-dimensional coordinate system as image channels, wherein the plurality of velocity units are one of a plurality of linear velocity units or a plurality of angular velocity units.

14. An apparatus comprising:

at least one processor; and a memory coupled to the at least one processor and storing programming instructions for execution by the at least one processor, the programming instructions instruct the at least one processor to perform operations comprising:

obtaining a motion feature image, by encoding a plurality of groups of human skeleton data of an action performed by a human body; and recognizing the motion feature image, based on an action recognition model, to obtain a recognition result, wherein the action recognition model is obtained through training based on a plurality of reference motion feature images corresponding to a plurality of types of actions and identifiers of the plurality of types of actions, and the recognition result is used to indicate an action type of the action; and wherein obtaining the motion feature image comprises:

collecting the plurality of groups of human skeleton data of performing the action, wherein each group of to-be-recognized human skeleton data comprises joint data of performing the action;

extracting, based on joint data in the plurality of groups of human skeleton data, a motion feature matrix corresponding to the plurality of groups of human skeleton data, wherein the motion feature matrix comprises a velocity matrix, wherein the velocity matrix is one of a linear velocity matrix or an angular velocity matrix; and encoding the motion feature matrix to obtain the motion feature image based on preprocessing the velocity matrix to determine a plurality of velocity units, wherein each velocity matrix of the plurality of velocity units is encoded by using coordinates of a joint point in the velocity unit in a three-dimensional coordinate system as image channels, wherein the plurality of velocity units are one of a plurality of linear velocity units or a plurality of angular velocity units.

* * * * *